(12) United States Patent
Bewley et al.

(10) Patent No.: US 9,670,649 B2
(45) Date of Patent: Jun. 6, 2017

(54) WEAR PART MONITORING

(71) Applicant: ESCO Corporation, Portland, OR (US)

(72) Inventors: Eric L. Bewley, Salem, OR (US);
Noah Cowgill, Milwaukie, OR (US);
Joseph E. Blomberg, Portland, OR (US)

(73) Assignee: ESCO CORPORATION, Portland, OR (US)

( * ) Notice: Subject to any disclaimer, the term of this patent is extended or adjusted under 35 U.S.C. 154(b) by 0 days.

(21) Appl. No.: 14/548,278

(22) Filed: Nov. 19, 2014

(65) Prior Publication Data
US 2015/0149049 A1 May 28, 2015

Related U.S. Application Data

(60) Provisional application No. 61/908,458, filed on Nov. 25, 2013.

(51) Int. Cl.
*E02F 9/26* (2006.01)
*E02F 9/28* (2006.01)
*E02F 3/40* (2006.01)
*E02F 9/24* (2006.01)

(52) U.S. Cl.
CPC .............. *E02F 9/2816* (2013.01); *E02F 9/24* (2013.01); *E02F 9/2833* (2013.01); *E02F 9/2883* (2013.01)

(58) Field of Classification Search
CPC ......... E02F 9/2816; E02F 9/24; E02F 9/2833; E02F 9/2883
USPC .......................................................... 701/50
See application file for complete search history.

(56) References Cited

U.S. PATENT DOCUMENTS

| 561,758 | A | | 6/1896 | Brewer |
|---|---|---|---|---|
| 4,001,798 | A | | 1/1977 | Robinson |
| 4,181,360 | A | | 1/1980 | Wilson |
| 4,187,626 | A | | 2/1980 | Greer et al. |
| 4,368,919 | A | | 1/1983 | Whittaker et al. |
| 4,407,081 | A | | 10/1983 | Hanson |
| 4,499,960 | A | | 2/1985 | Ehrich |
| 4,550,512 | A | * | 11/1985 | Felstet .................. E02F 9/2808 172/701.3 |
| 4,604,604 | A | | 8/1986 | Mann |
| 4,655,082 | A | | 4/1987 | Peterson |
| 4,700,224 | A | | 10/1987 | Miyasaka |

(Continued)

FOREIGN PATENT DOCUMENTS

| CA | 2880927 | 2/2014 |
|---|---|---|
| CN | 2913706 | 6/2007 |

(Continued)

OTHER PUBLICATIONS

Loadrite: On Board Weighing Systems for Escavators, www.loadrites.cales.com, pp. 1-6, (2012).

(Continued)

*Primary Examiner* — Anne M Antonucci
(74) *Attorney, Agent, or Firm* — Steven P. Schad

(57) ABSTRACT

A process and tool for monitoring the status, health, and performance of wear parts used on earth working equipment. The process and tool allow the operator to optimize the performance of the earth working equipment. The tool has a clear line of site to the wear parts during use and may be integrated with a bucket or blade on the earth working equipment.

43 Claims, 14 Drawing Sheets

(56) References Cited

U.S. PATENT DOCUMENTS

| | | |
|---|---|---|
| 4,709,265 A | 11/1987 | Silverman et al. |
| 4,809,794 A | 3/1989 | Blair et al. |
| 4,818,990 A | 4/1989 | Fernandes |
| 4,845,763 A | 7/1989 | Bandyopadhyay |
| 4,932,145 A | 6/1990 | Reeves, Jr. |
| 5,144,762 A | 9/1992 | Robinson |
| 5,555,652 A | 9/1996 | Ashby |
| 5,701,179 A | 12/1997 | Chatterjee |
| 5,743,031 A | 4/1998 | Launder et al. |
| 5,824,965 A | 10/1998 | Fujii et al. |
| 5,850,341 A | 12/1998 | Fournier et al. |
| 5,871,391 A | 2/1999 | Pryor |
| 5,926,558 A | 7/1999 | Zelt, III et al. |
| 6,032,390 A | 3/2000 | Bierwith |
| 6,360,850 B1 | 3/2002 | Odisho et al. |
| 6,363,173 B1 | 3/2002 | Stentz et al. |
| 6,497,153 B1 | 12/2002 | Hoskinson et al. |
| 6,518,519 B1 | 2/2003 | Crane, III et al. |
| 6,523,586 B1 | 2/2003 | Eromaeki et al. |
| 6,868,314 B1 | 3/2005 | Frink |
| 6,870,485 B2 | 3/2005 | Lujan et al. |
| 6,957,622 B2 | 10/2005 | Boettcher et al. |
| 6,990,390 B2 | 1/2006 | Groth |
| 7,248,154 B2 | 7/2007 | Menke |
| 7,574,821 B2 | 8/2009 | Furem |
| 7,579,952 B2 | 8/2009 | Osterhold |
| 7,677,079 B2 | 3/2010 | Radziszewski et al. |
| 7,836,615 B2 | 11/2010 | Winter |
| 7,874,085 B1 | 1/2011 | Winter et al. |
| 7,908,928 B2 | 3/2011 | Vik |
| 7,930,844 B2 | 4/2011 | Quarfordt et al. |
| 7,941,306 B2 | 5/2011 | Furem |
| 8,024,874 B2 | 9/2011 | McClanahan et al. |
| 8,050,489 B2 | 11/2011 | Eberle et al. |
| 8,087,477 B2 | 1/2012 | Sullivan et al. |
| 8,150,105 B2 | 4/2012 | Mian et al. |
| 8,240,070 B1 | 8/2012 | Phillips |
| 8,327,563 B2 | 12/2012 | Dingwall et al. |
| 8,386,196 B2 | 2/2013 | Wagner et al. |
| 8,405,721 B2 | 3/2013 | Bilandi et al. |
| 8,406,963 B2 | 3/2013 | Farmer et al. |
| 8,411,930 B2 | 4/2013 | Ridley |
| 8,583,313 B2 | 11/2013 | Mian |
| 8,738,304 B2 | 5/2014 | Hall |
| 8,738,342 B2 | 5/2014 | Lind et al. |
| 8,775,099 B2 | 7/2014 | Wagner |
| 8,791,997 B2 | 7/2014 | Munkelt et al. |
| 8,820,845 B2 | 9/2014 | Hall |
| 8,843,279 B2 | 9/2014 | Tafazoli Bilandi et al. |
| 8,872,818 B2 | 10/2014 | Freeman et al. |
| 9,036,861 B2 | 5/2015 | Chen et al. |
| 9,145,741 B2 | 9/2015 | Trinh et al. |
| 9,169,923 B2 | 10/2015 | Knisely |
| 9,234,422 B2 | 1/2016 | Hall |
| 9,235,902 B2 | 1/2016 | Jahanshahi et al. |
| 9,243,381 B2 | 1/2016 | Behmlander et al. |
| 9,310,189 B2 | 4/2016 | Burgunder et al. |
| 9,311,513 B2 | 4/2016 | Miller |
| 2004/0227645 A1 | 11/2004 | Lujan et al. |
| 2005/0261799 A1* | 11/2005 | Groth ............ E02F 3/435 700/180 |
| 2006/0243839 A9 | 11/2006 | Barscevicius et al. |
| 2007/0286474 A1 | 12/2007 | Dralle |
| 2008/0047170 A1 | 2/2008 | Nichols |
| 2010/0103260 A1 | 4/2010 | Williams |
| 2010/0215212 A1 | 8/2010 | Flakes, Jr. |
| 2011/0162241 A1 | 7/2011 | Wangsness |
| 2011/0309935 A1 | 12/2011 | Emmett et al. |
| 2011/0313625 A1 | 12/2011 | Miller et al. |
| 2011/0317909 A1 | 12/2011 | Jeyaraman et al. |
| 2012/0043980 A1 | 2/2012 | Davies |
| 2012/0098654 A1 | 4/2012 | Ebert |
| 2012/0136630 A1 | 5/2012 | Murphy et al. |
| 2012/0169876 A1 | 7/2012 | Reichert et al. |
| 2012/0218411 A1 | 8/2012 | Wu et al. |
| 2012/0262708 A1 | 10/2012 | Connolly |
| 2012/0300059 A1 | 11/2012 | Stege |
| 2013/0035875 A1 | 2/2013 | Hall et al. |
| 2013/0049935 A1 | 2/2013 | Miller |
| 2013/0082846 A1 | 4/2013 | McKinley et al. |
| 2013/0091745 A1 | 4/2013 | Moller |
| 2013/0145660 A1 | 6/2013 | Zamorano |
| 2013/0151170 A1 | 6/2013 | Uchida |
| 2013/0174453 A1 | 7/2013 | Cheyne et al. |
| 2014/0105481 A1 | 4/2014 | Hasselbusch et al. |
| 2014/0125804 A1 | 5/2014 | Dammers |
| 2014/0168420 A1 | 6/2014 | Naderhirn et al. |
| 2014/0212846 A1 | 7/2014 | Miller et al. |
| 2015/0085123 A1 | 3/2015 | Tafazoli Bilandi et al. |
| 2016/0178483 A1 | 6/2016 | Sidles |
| 2016/0221618 A1 | 8/2016 | Sidles |

FOREIGN PATENT DOCUMENTS

| | | |
|---|---|---|
| FR | 2977681 | 1/2013 |
| SU | 132140 | 11/1959 |
| SU | 174996 | 9/1965 |
| SU | 1254308 | 8/1986 |
| WO | WO 2006/128258 | 12/2006 |
| WO | WO 2012/112587 | * 9/2012 |
| WO | WO 2012/116408 | 9/2012 |

OTHER PUBLICATIONS

"Vision Sensors for the Detection of Rail Wear Zones on Train Cars", Sickinsight, http://wvvw.sickinsight-online.com/vision-sensors-for-the-detection-of-rail-wear-zones-on-trai.

Lim et al., "Tooth Guard: A Vision System for Detecting Missing Tooth in Rope Mine Shovel", https://jvbsoares.files.wordpress.com/2016/03/tooth_guard_wacv_2016.pdf.

Riegl, "Mobile Laser Scanning", www.riegl.com, http://www.riegal.com/nc/products/mobile-scanning/, Oct. 2, 2014.

Stephen Se et al., "Stereo-Vision Based 3D Modeling and Localization for Unmanned Vehicles", Intl J. of Intelligent Control & Systems, vol. 13, No. 1, pp. 47-58, Mar. 2008.

Trimble, "Applications and Markets", www.trimble.com, http://uas.trimble.com/applicants-and-markets, Oct. 2, 2014.

Trimble, "Installation Instructions: Trimble Yield Monitoring System", www.trimble.com, Version 2.00, Revision A, Westminster, CO., Dec. 2012.

Trimble, "Trimble Loadrite X2350 Excavator Scales", www.trimble.com, Westminster, CO., 2013.

Trimble, "Yield Monitoring", www.trimble.com, http://www.trimble.com/Agriculture/yield-monitoring.aspx, Nov. 7, 2014.

* cited by examiner

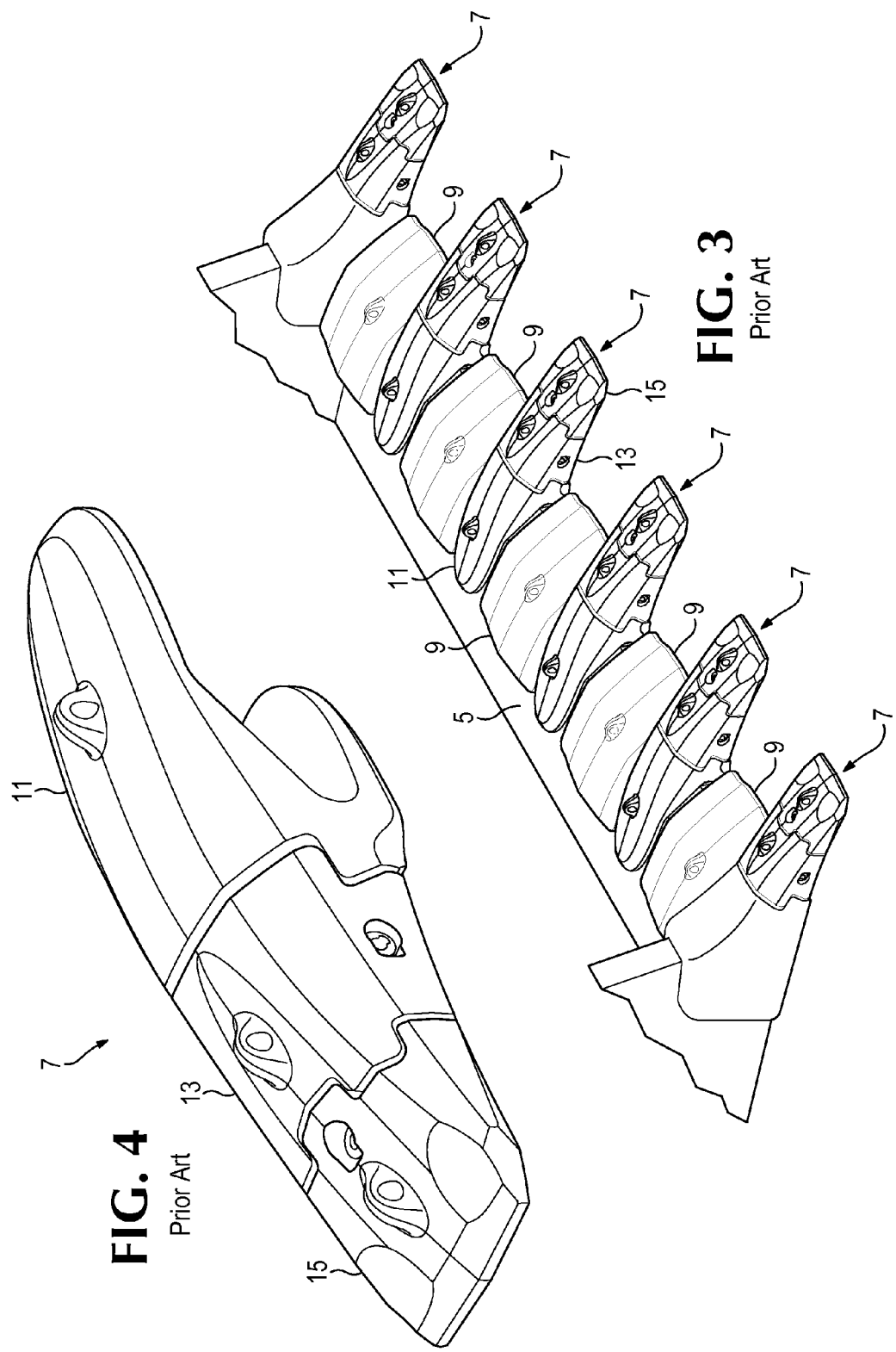

WEAR PART MONITORING

RELATED APPLICATION

This application claims priority benefits to U.S. Provisional Patent Application No. 61/908,458 filed Nov. 25, 2013 and entitled "Wear Part Monitoring," which is incorporated herein by reference in its entirety.

FIELD OF THE INVENTION

The present invention pertains to a system and tool for monitoring the status, health, and performance of wear parts used on various kinds of earth working equipment.

BACKGROUND OF THE INVENTION

In mining and construction, wear parts (e.g., teeth, shrouds, and lips) are commonly provided along the edges of excavating equipment to protect the underlying equipment from undue wear and, in some cases, also perform other functions such as breaking up the ground ahead of the digging edge. For example, buckets for dragline machines, cable shovels, face shovels, hydraulic excavators, and the like are typically provided with multiple wear components such as excavating teeth and shrouds that are attached to a lip of a bucket. A tooth typically includes an adapter secured to the lip of a bucket and a wear member attached to the adapter to initiate contact with the ground and break up the ground ahead of the digging edge of the bucket.

During use, the wear parts typically encounter heavy loading and highly abrasive conditions that at times cause the wear parts to become disengaged and lost from the excavating machine. For example, as a bucket engages the ground a wear member, also known as a point, occasionally will be lost from the adapter. The operators of the excavating machines are not always able to see when a wear part has been lost. It is well known that a lost wear part may cause damage to downstream excavating equipment. For example, a lost wear member may cause damage that leads to additional downtime for conveyors, screens, pumps, and crushers. If a wear part becomes caught in a crusher, the wear part may be ejected and cause a hazard to workers or it may be jammed and require an operator to dislodge the part, which at times may be a difficult, time-consuming and/or hazardous process. Additionally, continuing to operate the excavating equipment with missing wear parts can lead to a decrease in production and excessive wear on other components on the excavating equipment.

The abrasive environment causes the wear parts to eventually become worn. If the wear parts are not replaced at the appropriate time, an excessively worn wear part can be lost, production may decrease, and other components of the excavating equipment may experience unnecessary wear.

Systems with varying degrees of success have been used to monitor when a wear member has been worn or damaged and needs replacement. For example, the Tooth-Wear Monitoring system and Missing Tooth Detection system sold by Motion Metrics uses an optical camera mounted on a shovel boom of excavating equipment. In addition, U.S. Pat. No. 8,411,930 relates to a system and method for detecting damaged or missing wear members. The system has a vibration resistant video camera that is preferably mounted on a shovel boom. Because the above systems are located on the shovel boom, the systems only have a clear view of the wear members during a portion of the digging and dumping operation. As a result, there is potential for the systems to not immediately register that a wear member has been lost or needs replacement. In addition should the systems incorrectly register that a wear member has been lost, the systems may have to wait until the next digging and dumping cycle to confirm that the wear member is truly lost and that an object was not obstructing the systems view and registering a false alarm.

Other systems with varying degrees of success have been used to monitor if a wear member is secured to the base on an excavating machine. For example, mechanical systems have been fixed between the wear member and the base for detecting the absence and presence of the wear member. In U.S. Pat. No. 6,870,485, the system contains a spring loaded switch between the wear parts. When the wear parts are separated an electrical switch activates a radio transmitter alerting the operator that a wear part has been lost. In U.S. Pat. No. 5,743,031, the system comprises an indicator attached to the tooth and an actuator secured to the nose. In one example, the actuator actuates, a smoke canister to provide a visual signal that the tooth has fallen off or is about to fall off. These systems do not determine when a wear member has reached the end of life and needs to be replaced and these mechanical systems can be costly and cumbersome to install when a wear member is worn and needs replacement.

SUMMARY OF THE INVENTION

The present invention pertains to a system and tool for monitoring wear parts for earth working equipment. The monitoring tool is particularly well suited for monitoring the presence and health (i.e., the current wear profile) of wear parts utilized with buckets used for excavating in mining and construction environments.

In one aspect of the invention, electronic sensors are used in conjunction with programmable logic to determine if wear parts are present on the earth working equipment. If a wear part is not present the programmable logic triggers an alert. The alert notifies the operator when a wear part has been lost from the excavating equipment. This allows the operator to take the necessary actions to ensure that the missing wear part is replaced and that the missing wear part does not damage downstream excavating equipment. As examples, the electronic sensor may be a camera, a laser range finder, an ultrasonic sensor, or another distance measuring sensor. In one preferred construction, the camera is chosen from a group consisting of 2D cameras, 3D cameras, and infrared cameras.

In another aspect of the invention, electronic sensors are used in conjunction with programmable logic to determine the degree a wear part on the earth working equipment has been worn. If the wear part is worn a predetermined amount the programmable logic triggers an alert. The alert notifies the operator when a worn wear part should be replaced. This allows the operator to take the actions needed to replace the worn wear part so that other components of the earth working equipment do not experience unnecessary wear. As examples, the electronic sensor may be a camera, a laser range finder, an ultrasonic sensor, or another distance measuring sensor. In one preferred construction, the camera is chosen from a group consisting of 2D cameras, 3D cameras, and infrared cameras.

In another aspect of the invention, electronic sensors are used in conjunction with programmable logic to determine how full a bucket is loaded during a digging operation. In one preferred construction, the programmable logic may be programmed to communicate the current and past loads for each digging cycle to an operator or wireless device. This allows the operator to adjust the digging operation to optimally fill the bucket to the desired capacity. This system could be a stand-alone system or integrated with another system such as a monitoring system for monitoring the presence and/or health of wear parts installed on the bucket. As examples, the electronic sensor may be a camera, a laser range finder, an ultrasonic sensor, or another distance measuring sensor. In one preferred construction, the camera is chosen from a group consisting of 2D cameras, 3D cameras, and infrared cameras.

In another aspect of the invention, electronic sensors and programmable logic are used to determine a percentage that the bucket has been filled. The percentage may be determined by measuring the current fill of the bucket and comparing the current fill to the rated capacity of the bucket. The electronic sensor may be, for example, a camera, a laser range finder, an ultrasonic sensor, or another distance measuring sensor. In one preferred construction, the camera is chosen from a group consisting of 2D cameras, 3D cameras, and infrared cameras. This system could be a stand-alone system or integrated with another system such as a bucket fill monitoring system.

In another aspect of the invention, electronic sensors are used to determine the digging cycle time. In one preferred construction, programmable logic may be programmed to communicate the current cycle time and past cycle times for each digging cycle of the bucket to an operator or wireless device. This allows the operator to adjust the digging operation for optimal performance. As examples, an accelerometer and/or an inclinometer may be used to determine the beginning of a digging cycle. This system may be a stand-alone system or may be integrated with another system such as a monitoring system for monitoring the presence and/or health of wear parts installed on the bucket.

In another aspect of the invention, electronic sensors are used to determine high impact events on a bucket digging edge (i.e., higher than experienced during the normal digging operation). In one preferred construction, programmable logic may record the time of the high impact event. The programmable logic may be programmed to communicate the high impact events to an operator or wireless device. As an example, an accelerometer may be used to determine when a high impact event occurs. This system may be a stand-alone system but can be integrated with another system such as a monitoring system for monitoring the presence and/or health of wear parts installed on the bucket. This allows an operator or maintenance personnel to better determine what may have caused the current state of the wear parts (e.g., the wear member is present, the wear member is lost, and the wear member is worn).

In another aspect of the invention, a tool is installed on a wear part that engages and moves the earth to be excavated. In one preferred construction the tool is installed on a bucket used for excavating so that the monitoring system has a clear line of sight to a digging edge of the bucket throughout the digging and dumping operation. The tool may be secured to an interior surface of the bucket or the tool may be secured to an exterior surface of the bucket. As examples, the monitoring system may be integrated with the shell of the bucket, integrated between two interior plates of a bucket having a double wall shell, or installed on the bridge or top of the bucket.

In another aspect of the invention, features are incorporated onto the wear part to aid in absence and presence detection. In one preferred construction, the features are incorporated onto an adapter so that if the monitoring system is able to detect the feature the monitoring system is programmed to send an alert that the wear member has been lost. In another preferred construction, the features are incorporated onto the wear member so that if the monitoring system is able to detect the feature the monitoring system is programmed to indicate that the wear member has not been lost from the excavating equipment.

In another aspect of the invention, features are incorporated onto the wear part to aid in determining the degree a wear part on the excavating equipment has been worn. In one preferred construction, a wear part contains multiple features along the length of the expected wear profile so that as the wear part wears the monitoring system is able to detect the number of features remaining on the wear part.

In another aspect of the invention, the monitoring system provides alerts to equipment operators, databases, and remote devises when the wear parts on the excavating equipment need maintenance. In one preferred construction, the monitoring system communicates wirelessly.

In another aspect of the invention, the monitoring system is provided with a device to display or indicate the status, health, and performance of the wear parts. In one preferred construction, the monitoring system is provided with a monitor. In another preferred construction, the monitoring system is integrated with a display system that is a part of the excavating equipment being monitored or a display that is remote to the monitoring system.

In another aspect of the invention, the monitoring system stores the history of the status, health, and performance of the wear parts.

In another aspect of the invention, the monitoring system utilizes lights to illuminate the wear parts to be monitored so that the electronic sensors provide accurate readings regarding the status, health, and performance of the wear parts.

BRIEF DESCRIPTION OF THE DRAWINGS

FIG. 3 is a perspective view of a prior art lip of an excavator hoe bucket.

FIG. 4 is a perspective view of a prior art tooth assembly.

DETAILED DESCRIPTION OF THE PREFERRED EMBODIMENTS

The present invention pertains to a system for monitoring the status, health, and performance of wear parts used on various kinds of earth working equipment including, for example, excavating equipment and ground conveying equipment. Excavating equipment is intended as a general term to refer to any of a variety of excavating machines used in mining, construction and other activities, and which, for example, include dozers, loaders, dragline machines, cable shovels, face shovels, and hydraulic excavators. Excavating equipment also refers to the ground-engaging components of these machines such as the bucket, blade, or the cutter head. Ground conveying equipment is also intended as a general term to refer to a variety of equipment that is used to convey earthen material and which, for example, includes chutes and mining truck beds or bodies. The present invention is suited for monitoring the status, health and performance of wear parts used on excavating equipment in the form of, for example, excavating buckets, blades, lips, teeth, and shrouds. Additionally, certain aspects of the present invention are also suited for monitoring the status and health of a wear surface in the form of, for example, runners and truck beds or bodies. For convenience of discussion, the wear part monitoring process is discussed in terms of a monitoring system that monitors a point on a mining excavator, however, the monitoring process may be used with other wear parts used with many kinds of earth working equipment.

Relative terms such as front, rear, top, bottom and the like are used for convenience of discussion. The terms front or forward are generally used to indicate the usual direction of travel of the earthen material relative to the wear part during use (e.g., while digging), and upper or top are generally used as a reference to the surface over which the material passes when, for example, it is gathered into the bucket. Nevertheless, it is recognized that in the operation of various earth working machines the wear assemblies may be oriented in various ways and move in all kinds of directions during use.

Figure 1:
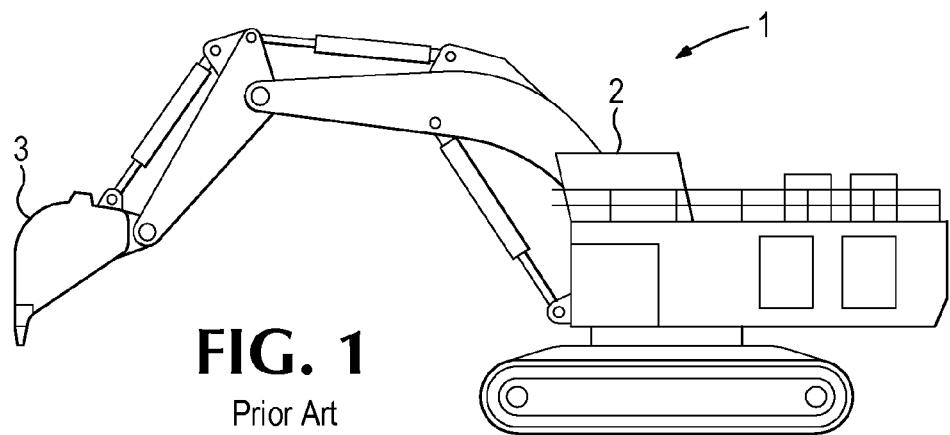
FIG. 1 is a side view of a prior art mining excavator.
Figure 2:
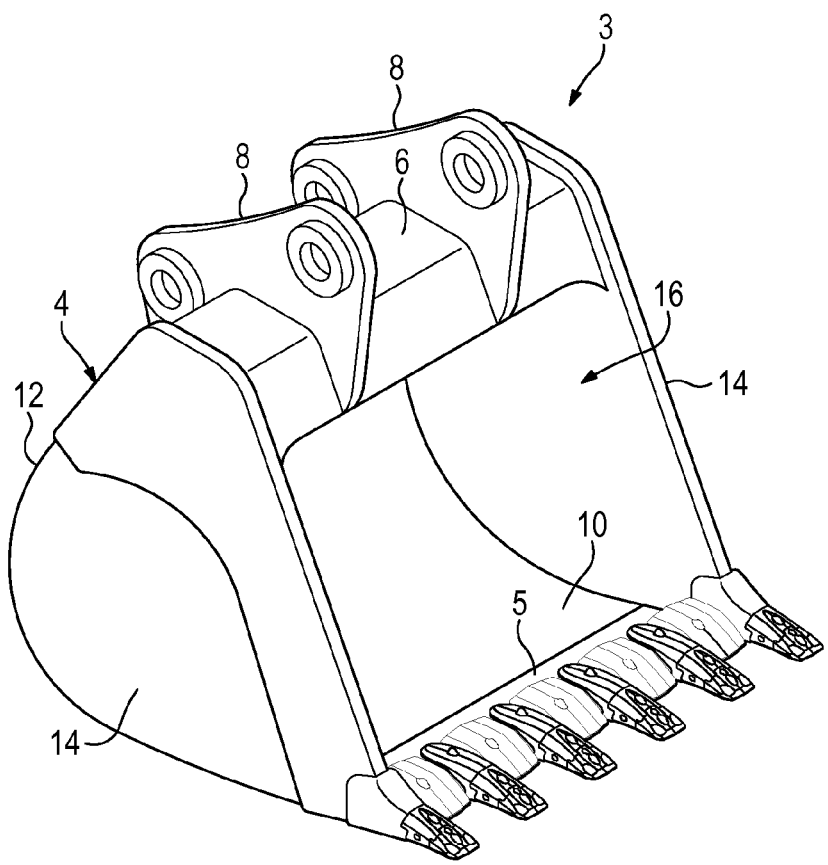
FIG. 2 is a perspective view of a prior art excavator hoe bucket.
Figure 5:
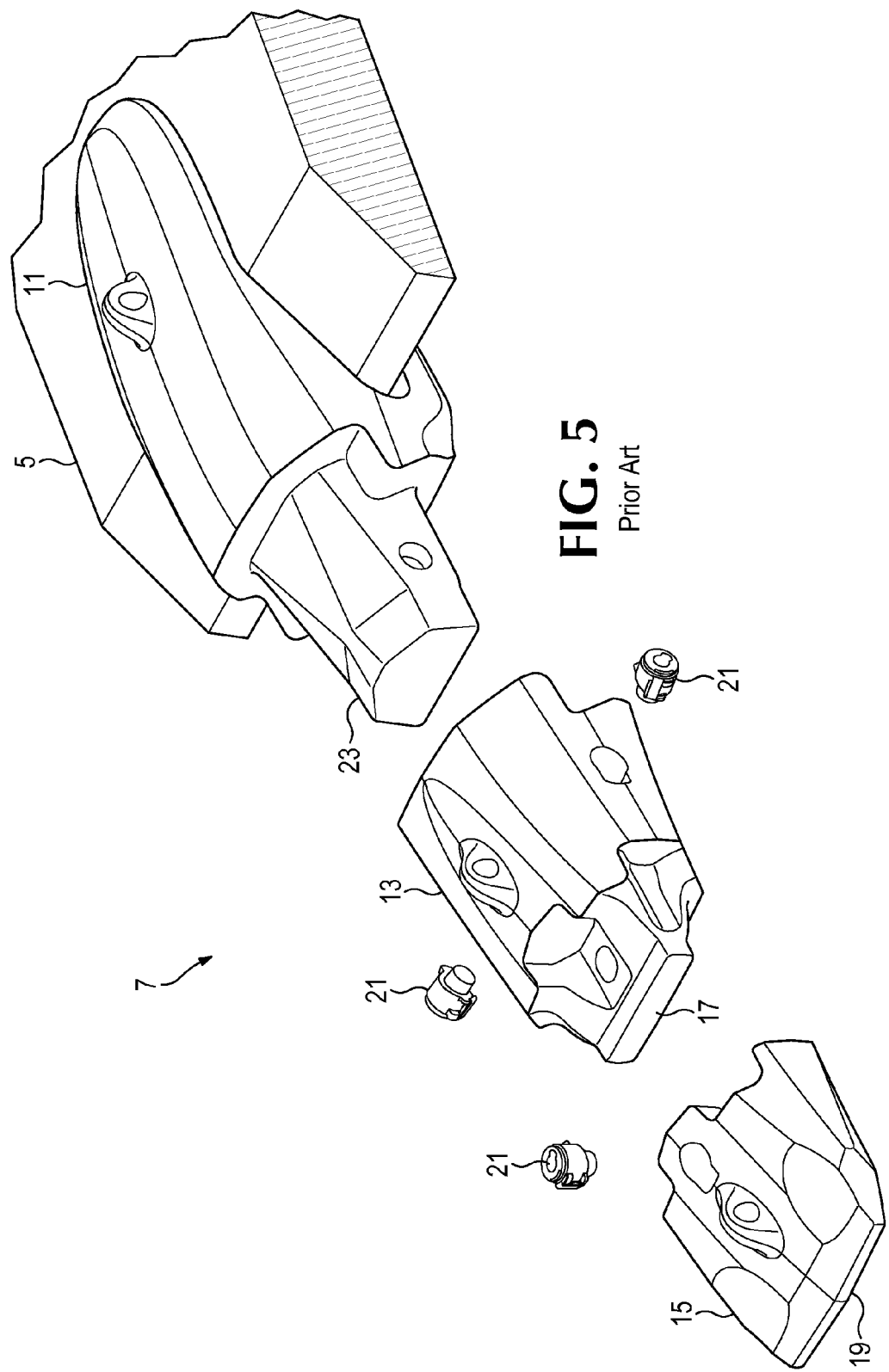
FIG. 5 is an exploded perspective view of the tooth assembly shown in FIG. 4.
Figure 6:
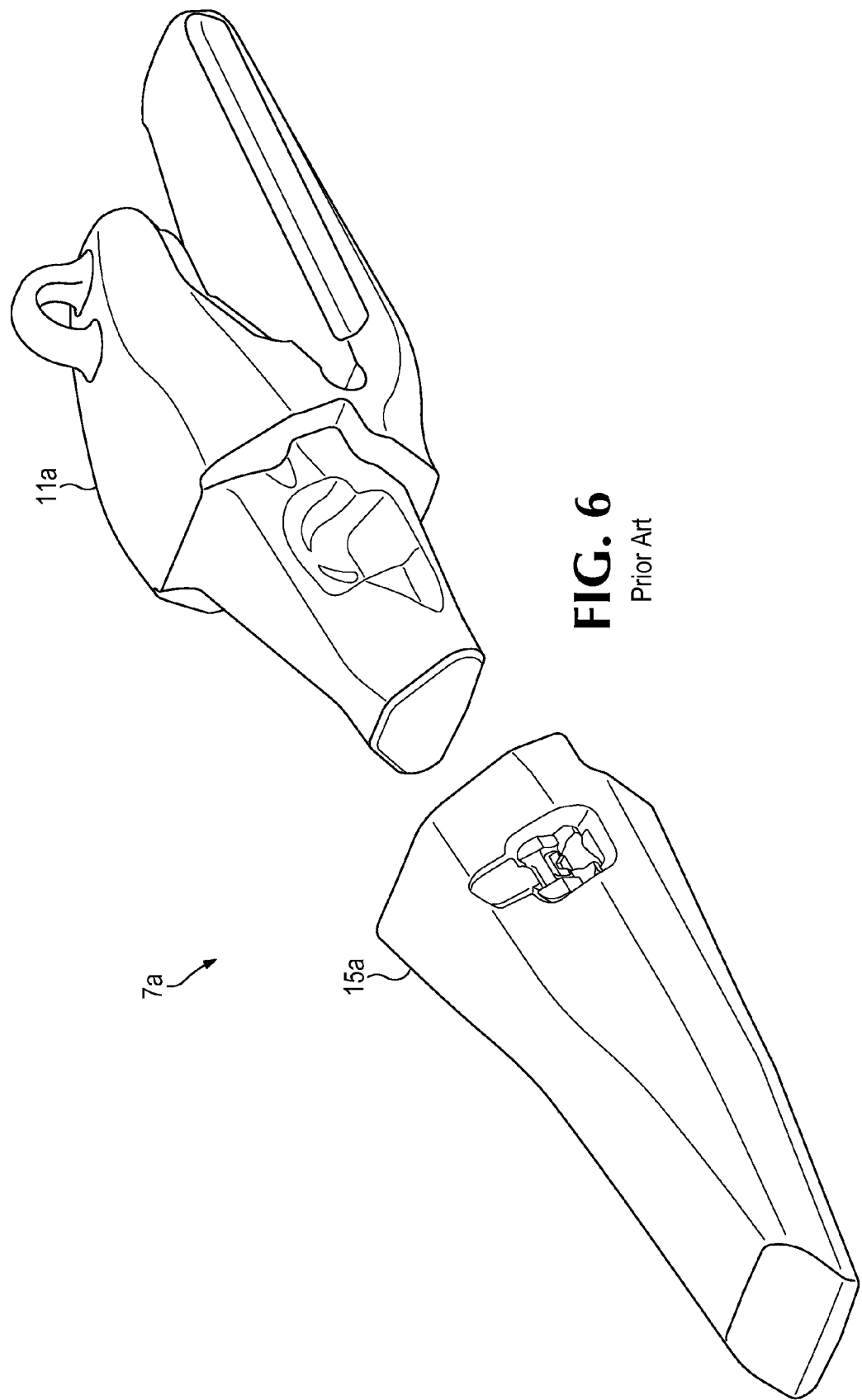
FIG. 6 is a partially exploded perspective view of a prior art tooth assembly only having a point and an adapter.

A mining excavator 1 is equipped with a bucket 3 for gathering earthen material while digging (FIG. 1). The bucket 3 includes a frame or shell 4 defining a cavity 16 for gathering material during the digging operation (FIG. 2). Shell 4 may include a top wall 6 having attachment supports 8 to attach the bucket 3 to earthmoving equipment 1, a bottom wall 10 opposite the top wall 6, a rear end with a back wall 12, and a pair of opposing sidewalls 14 each located between the top wall 6, the bottom wall 10, and the back wall 12. The shell 4 may be constructed with walls having a single plate or may be constructed with portions of the bucket having double plates as is well known. Multiple configurations of buckets are known and variations in bucket geometry exist, for example, the bucket may not have a top wall as in a dragline bucket, the rear wall may be hinged as in a dipper bucket, or a portion of the side walls may be hinged as in a hydraulic face shovel bucket. The specific geometry of the bucket is not intended to be limiting as the present invention can be used with various types of buckets and with various types of wear parts used on earth working equipment. The bucket 3 has a lip 5 that extends forward of the bottom wall 10 and is the digging edge of the bucket 3 (FIGS. 2 and 3). The digging edge is that portion of the equipment that leads the contact with the ground. Tooth assemblies and shrouds are often secured to the digging edge to protect the edge and break up the ground ahead of the lip 5. Multiple tooth assemblies 7 and shrouds 9, such as disclosed in US Patent Application Publication US-2013/0174453 which is incorporated herein by reference, may be attached to lip 5 of bucket 3 (FIGS. 2-5). The illustrated tooth 7 includes an adapter 11 welded to lip 5, an intermediate adapter 13 mounted on adapter 11, and a point (also called a tip) 15 mounted on base 13. Point 15 includes a rearwardly-opening cavity to receive nose 17 of base 13, and a front end 19 to penetrate the ground (FIG. 5). Securement mechanisms or locks 21 are used to secure wear member 15 to base 13, and base 13 to nose 23 (FIG. 5). Other tooth arrangements are possible, for example, the tooth assembly 7a may be defined with just an adapter 11a secured to the lip and a point 15a (FIG. 6), such as disclosed in U.S. Pat. No. 7,882,649 which is incorporated herein by reference. One aspect of the present invention pertains to monitoring the presence and/or health of the wear member on a base. For ease of discussion the application generally discusses monitoring the presence and/or health of a wear member on a base secured to an excavating bucket. However, the invention could be used to monitor the presence and/or health of a wear member on a base on various types of earth working equipment and may monitor a point on an adapter, a point on an intermediate adapter, an intermediate adapter on an adapter, an adapter, a nose of a cast lip, a shroud, a lip, a blade, a wear runner, a truck liner, or other wear member of other kinds of earth working equipment. During the life of the bucket or other equipment, the wear member wears out and needs to be replaced a number of times.

Figure 7A:
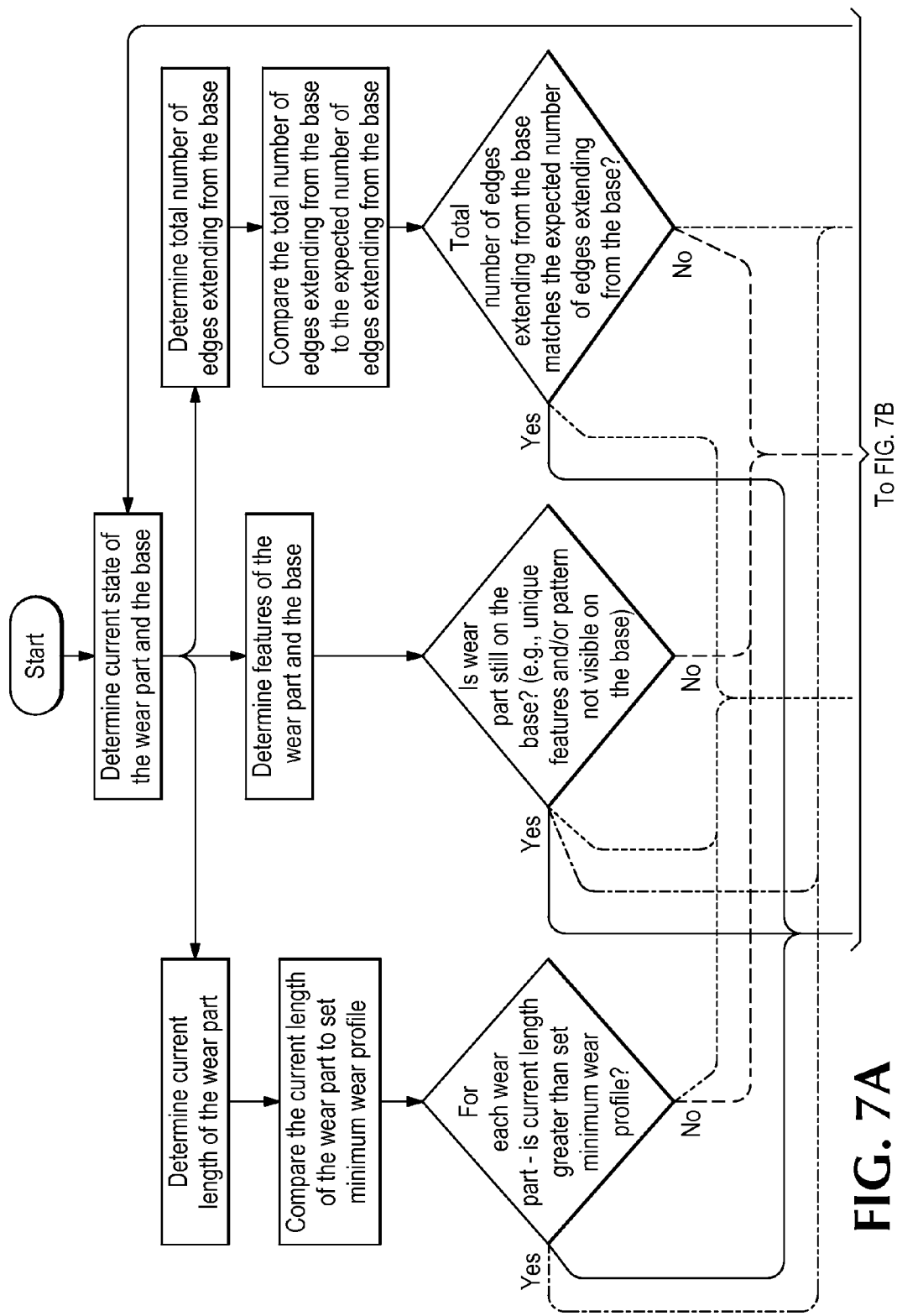
FIGS. 7A and 7B outline the general process steps for monitoring the status and health of wear parts in accordance with the present invention.
Figure 7B:
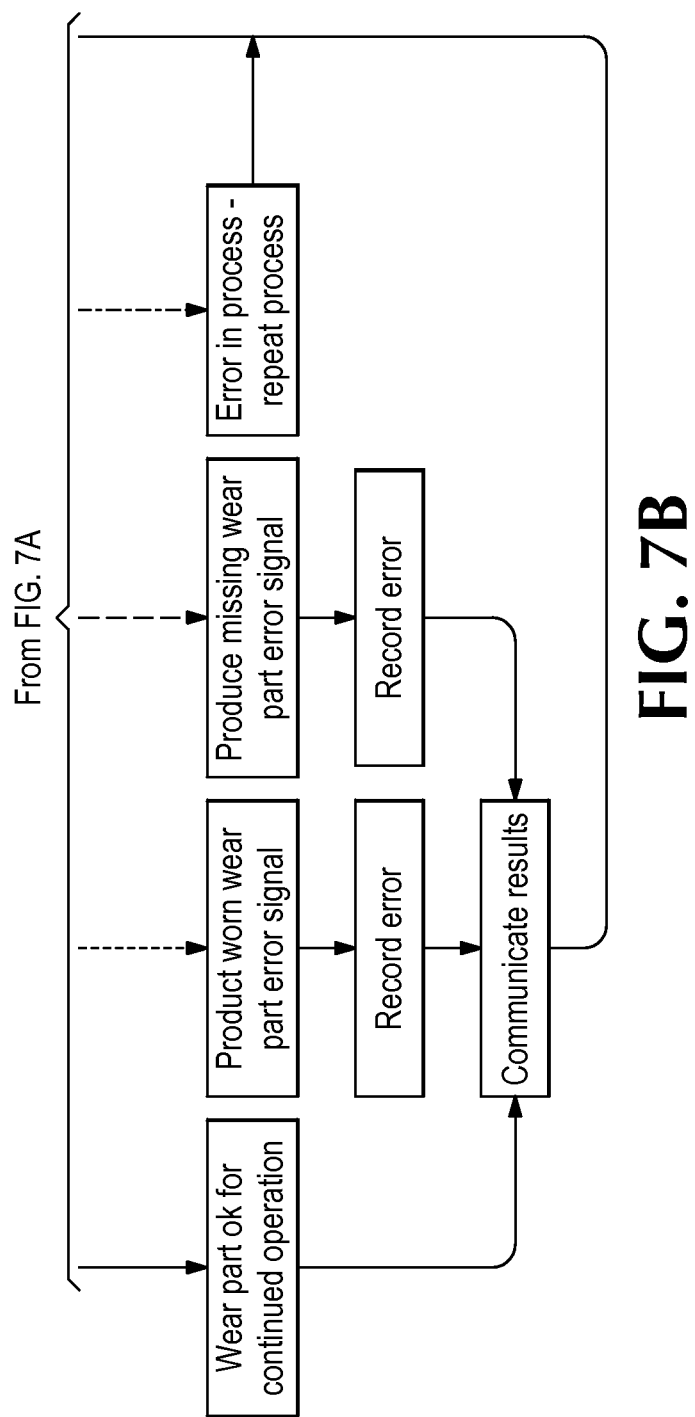

When a wear member reaches a minimum recommended wear profile (i.e., the wear member is considered fully worn), the wear member is replaced so that production does not decrease and the base, upon which the wear member rests, does not experience unnecessary wear. FIGS. 7A and 7B illustrate the steps to a monitoring system that monitors the status and health of wear members on an excavating bucket. The process displays three different wear member checks that are performed in parallel and the results of the three checks results in a process outcome (e.g., wear member ok for continued operation, wear member is worn, and wear member is missing). Variations in the process exist, for example, it may be desirable to only monitor if the wear members are present or to only monitor when the wear members are worn such that they should be replaced. In another example, it may be desirable to perform more than 3 different wear member checks or to perform less than 3 wear member checks or to only utilize portions of the process. In another example the process may be performed in serial (i.e., perform first wear member check and proceed to next wear member check if needed). It is also possible for the system to estimate the remaining useful life of the wear part based on the amount of the wear part remaining and the rate of wear to assist the operator in determining when to replace the wear parts.

Figure 8:
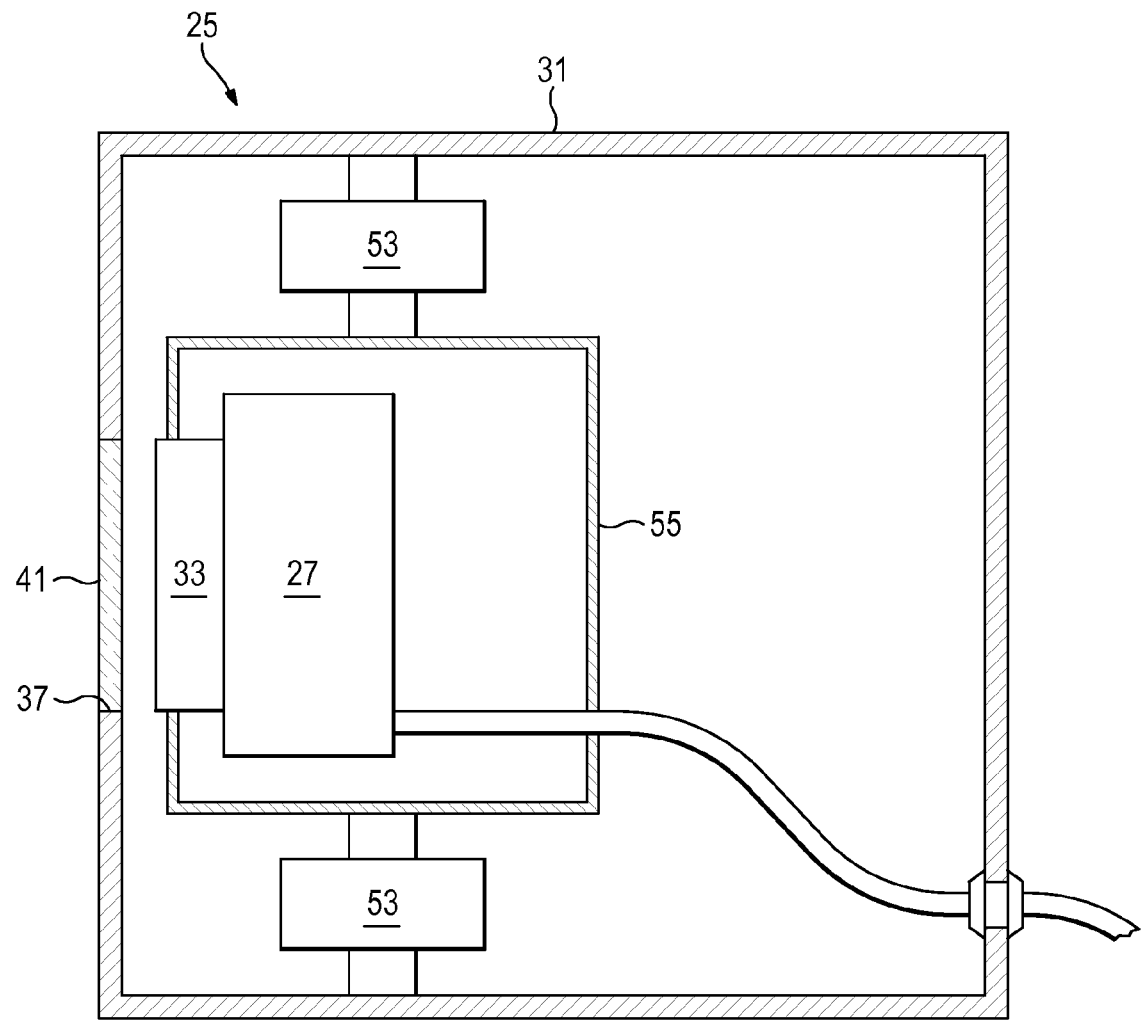
FIG. 8 is a cross section of a monitoring system of the present invention.

Because each type of wear member has a recommended or set minimum wear profile, one of the wear member checks may be to determine the current length of each wear member on the bucket. The monitoring system 25 may use an electronic sensor 27 to determine the current length of each wear member on the bucket (FIG. 8). The length of the wear members may be, for example, determined by a camera, an ultra-sonic sensor, a laser interferometer, or another distance measuring sensor. In some embodiments the camera may be an optical camera or the camera may be a thermal imaging camera. In some embodiments, the monitoring system may be equipped with lights to illuminate the wear part(s) being monitored so that the electronic sensors may provide accurate readings. The lights illuminating the wear part(s) may alternatively be a part of the earth working equipment or it may not be necessary to illuminate the wear parts. If the monitoring system uses a camera to determine the lengths of the wear members on the bucket, the camera may first acquire an image of the lip 5 and the attached tooth assemblies 7 (FIG. 3). Next programmable logic on a Central Processing Unit (CPU), controller, PC, or Programmable Logic Controller (PLC) (all of which will be generally referenced as a controller) may apply a reference line to the image of the bucket lip (not shown). The reference line may, for example, define the limit of wear allowed for each of the wear members, may represent the lip of the bucket, or the reference line may be an arbitrary line to establish a "rearward edge" or end point for the programmable logic. The reference line may be, for example, straight or non-straight depending on the type of lip and/or wear members. The reference line (not shown) will preferably be located rearward of the leading edge of the lip 5 (FIG. 5). The programmable logic may have integrated vision recognition software to determine the leading edge of each wear member on the lip of the bucket. The vision recognition software may be, for example, In-Sight sold by Cognex. The programmable logic is programmed to count the number of pixels between the reference line and the leading edge of each wear member. Based on the pixel count the programmable logic is programmed to determine the current length of each wear member. Once the current length of each wear member is determined, the programmable logic compares the current length to the set minimum wear profile for the type of wear members installed on the bucket. The programmable logic may reference a database with the type of wear members currently installed on the bucket or may determine the type of wear members installed on the bucket using vision recognition software. The programmable logic may also reference a database of bucket and wear part geometry to assist the vision recognition software in determining the type and number of wear members installed on the bucket. If the length of each wear member on the bucket is greater than the set minimum wear profile (i.e. within a set range) and the results of the other parallel wear member checks are acceptable (e.g., wear member is on the base and the number of edges extending from the base match the expected number of edges extending from the base) the programmable logic may be programmed to loop back to the start of the process and again determine the length of each wear member (FIGS. 7A and 7B). The programmable logic may continually loop through the process or there may be a delay built into the process so that the process is run once during a set time limit. If the current length of at least one wear member was close to the minimum wear profile (i.e. within a set range) and the results of the other parallel wear member checks are acceptable (e.g., wear member is on the base and the number of edges extending from the base match the expected number of edges extending from the base), the programmable logic may be programmed to produce a precautionary alert that a specific wear member is close to needing replacement. The alert may be, for example, a visual alert, haptic feedback, and/or an audio alert. The monitoring system may wirelessly provide the alerts to equipment operators and/or wireless devises for access by the operator or other such as maintenance personnel, mine site managers or the like. If, however, the length of each wear member is not greater than the minimum wear profile (i.e. less than a set range) and the results of the other parallel wear member checks are acceptable (e.g., wear member is on the base and the number of edges extending from the base match the expected number of edges extending from the base) the programmable logic may be programmed to produce an alert that the wear member has been worn. The programmable logic may be programmed to immediately produce the alert or, to reduce false alarms; the programmable logic may be programmed, for example, to repeat the process a preset number of times or to repeat the process over a preset time frame to validate that outcome of the process. This reduces the likelihood that the programmable logic does not register an object obstructing the wear member or the electronic sensor as a worn or missing wear member.

Because each wear member and each base has a specific geometry, another wear member check may be to determine the features of each wear member and base on the bucket to assist with knowing if the wear member is still attached to the base. As will be disclosed in detail below, unique features and/or patterns may also be included on the wear member or on the base to assist with knowing if the wear member is still attached to the base. If the key features, unique features and/or patterns are incorporated onto the wear member and the monitoring system is able to detect the feature and the results of the other parallel wear member checks are acceptable (e.g., wear profile is acceptable and the number of edges extending from the base match the expected number of edges extending from the base), the monitoring system is programmed that the wear member has not been lost from the excavating equipment. In an alternative embodiment, the unique features and/or patterns are incorporated onto a base such that the unique feature and/or pattern can only be seen if the wear member is missing. If the monitoring system registers the features and/or pattern and the results of the other parallel wear member checks are not acceptable (e.g., wear profile is not acceptable and the number of edges extending from the base does not match the expected number of edges extending from the base), the monitoring system is programmed to produce an alert that the wear member has been lost.

Because each base has a specific number of edges extending from it (i.e., for each base there is one wear part extending from the base), another wear member check may be to determine how many edges are extending from the base attached to the lip of the bucket to assist with knowing if the wear member is still attached to the base. This may be done by counting the number of edges extending from the base or lip (i.e., the number of edges extending from the base or lip in a forward direction parallel to the motion of the bucket in a normal digging operation) and comparing them to the expected number of edges extending from the base or lip. If, for example, the number of edges extending from the base or lip does not match the expected number of edges extending from the base or lip and the results of the other parallel wear member checks are acceptable (e.g., wear profile is acceptable and the wear part is on the base), the programmable logic is programmed to give a precautionary alert (not shown) and/or may be programmed to repeat the monitoring process from the beginning. The monitoring process may be repeated because there may have been an error in the process (e.g., a rock or other item was misinterpreted as a wear member). In a similar fashion if the wear member is on the base but the number of edges extending from the base does not match the expected number of edges extending from the base and the wear profile of the wear part is not acceptable, the programmable logic is programmed to repeat the monitoring process from the beginning (not shown in FIGS. 7A and 7B). In an alternative embodiment the programmable logic may be programmed to send a precautionary alert (e.g., the wear member may be worn but something may be lodged between the wear members, or the wear member may be lost and an object is being misinterpreted as a wear member). If the wear profile is acceptable and the number of edges extending from the base matches the expected number of edges extending from the base but the wear member is not on the base (e.g. unique feature on base normally not visible when wear member is present is currently visible), the programmable logic may be programmed to repeat the monitoring process from the beginning as something may have caused an error in the process (not shown in FIGS. 7A and 7B). If the wear profile is not acceptable and wear member is not on the base but the number of edges extending from the base matches the expected number of edges extending from the base, the programmable logic may be programmed to repeat the monitoring process from the beginning as something may have caused an error in the process (not shown in FIGS. 7A and 7B). If the wear profile is acceptable but the number of edges extending from the base does not match the expected number of edges extending from the base and the wear member is not on the base, the programmable logic may be programmed to repeat the monitoring process from the beginning as something may have caused an error in the process (not shown in FIGS. 7A and 7B).

The results and alerts from the process may be sent to a Human Machine Interface (HMI). Details of the HMI will be discussed in further detail below. The bucket health monitoring system may also communicate with other computer systems wirelessly or through a cable the specific wear member(s) needing maintenance either because the wear member is lost or because the wear member is worn past the minimum wear profile. In addition the monitoring system may store all of the results from the process.

Figure 19:
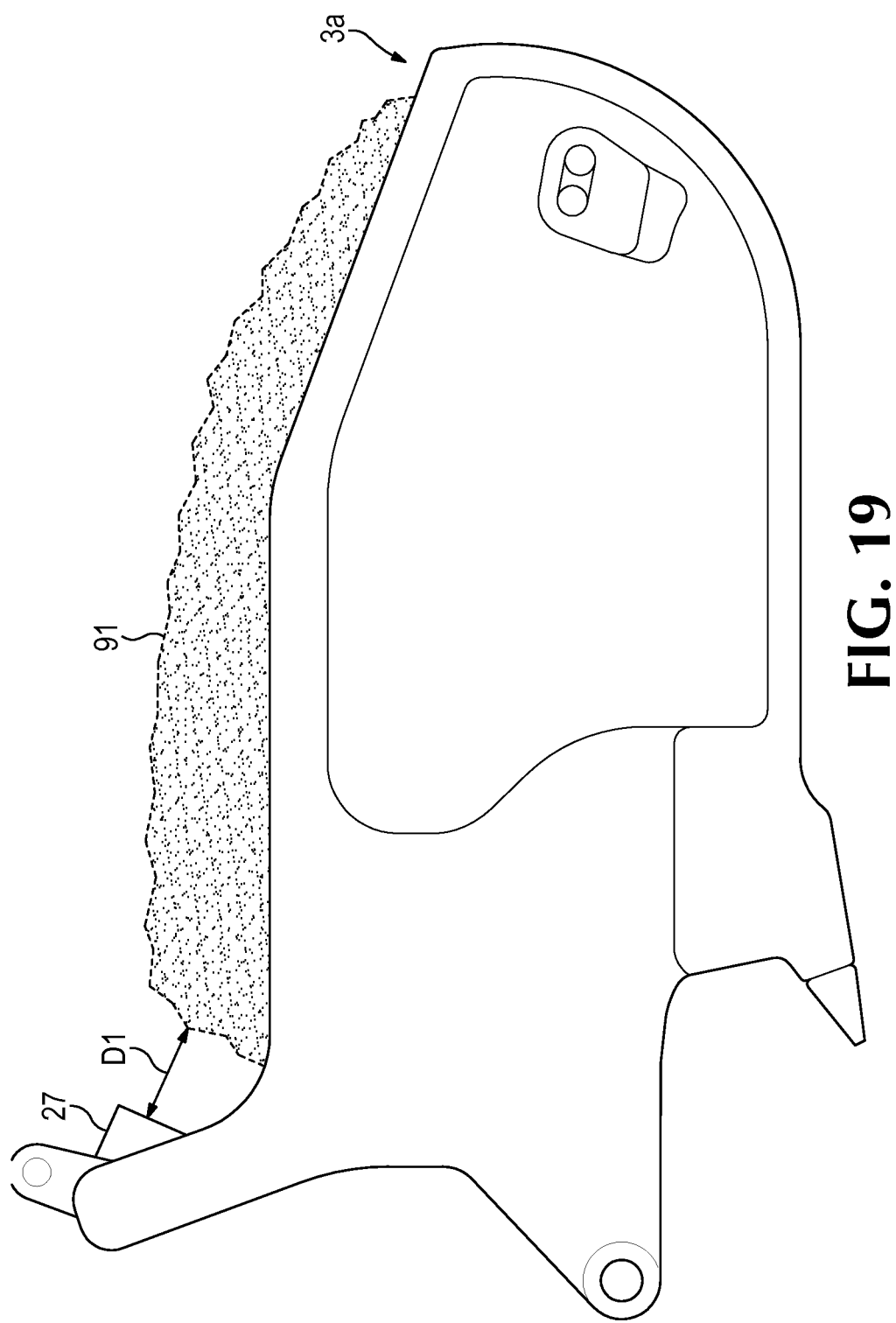
FIG. 19 is a side view of an electronic sensor to determine the fill of a bucket in accordance with the present invention.
Figure 20:
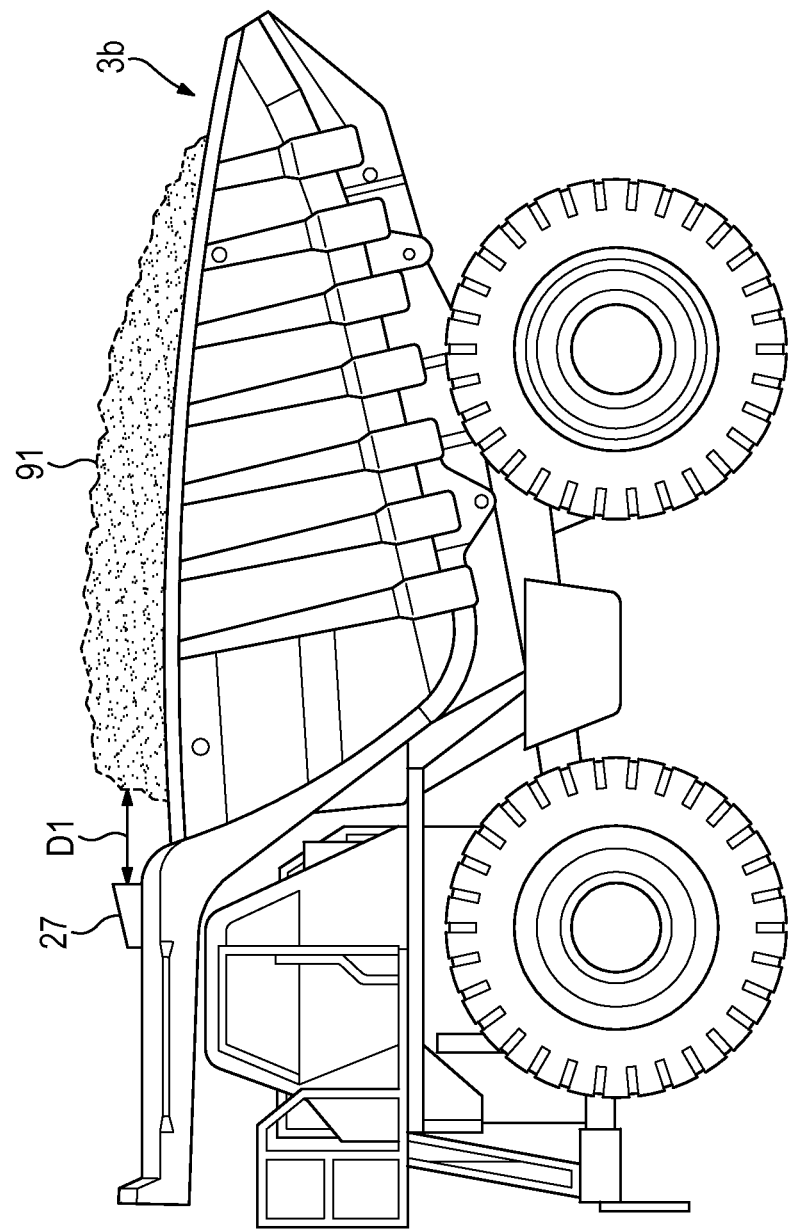
FIG. 20 is a side view of an electronic sensor to determine the fill of a truck body in accordance with the present invention.

In addition to monitoring the status and health of the wear members on the bucket, the monitoring system may monitor the performance of the bucket or other wear members. For example, the monitoring system may determine how full the bucket is loaded during the digging cycle. As the bucket is loaded, the material being excavated has a tendency to fill the bucket with an established profile. Once the bucket $3a$ has been filled by the operator the electronic sensors 27 measure the distance D1 to the load 91 within the bucket $3a$ (FIG. 19) and programmable logic uses the distance and a database of established fill profiles to determine the volume of the load within the bucket. The electronic sensors 27 and programmable logic may also determine a percentage that the bucket has been filled. The percentage may be determined by comparing the current fill of the bucket to the rated capacity of the bucket. In an alternative embodiment, the electronic sensors 27 may measure the distance D1 to the load 91 within a truck body $3b$ (FIG. 20) and programmable logic uses the distance and a database of established fill profiles to determine the volume of the load within the truck body. Similar to the bucket the electronic sensors may be used to determine the percentage that the truck body has been filled. The electronic sensor may be a camera, a laser range finder, an ultrasonic sensor, or another distance measuring sensor. Programmable logic may determine the percentage the bucket is filled based on the distance to the load within the bucket and. The results from the current digging cycle and past digging cycles may be communicated to the equipment operator or to other databases and computer systems. This allows the equipment operator to adapt how the operator digs to optimally fill the bucket and truck body. The monitoring system may, for example, use the same electronic sensors used for monitoring the status and health of the wear parts or may use separate electronic sensors to monitor the fill of the bucket. The electronic sensors may be, for example, a camera, a laser range finder, or an ultrasonic sensor. The camera may be, for example, a 3D camera capable of determining depth or may be a camera coupled with vision recognition software as outlined above. It is also possible for the electronic sensors for determining the fill of the bucket to be separate components from the monitoring system and not be incorporated with the monitoring system. The use of a monitoring system to monitor the filling of a bucket could be used as a stand-alone system, i.e., without a system to monitor the presence and/or health of the wear parts. This type of monitoring system could also be used in non-bucket applications (e.g., such as truck trays) to monitor the efficiency or optimization of the operator.

The monitoring system may be equipped with electronic sensors that are capable of determining the cycle time of a digging cycle. For example, the monitoring system may be equipped with an accelerometer and an inclinometer (not shown). The inclinometer provides the orientation of the bucket and the accelerometer registers a spike in force when the bucket is at the appropriate digging orientation and thus indicating that the digging cycle has started. Programmable logic may determine the time from the start of one digging cycle to the start of the second digging cycle (i.e., time between peaks when inclinometer indicates that the bucket is at the appropriate digging orientation). The results from the current cycle time and past cycle times may be communicated to the equipment operator or to a wireless device. This allows the operator to adjust the digging operation for optimal performance. It is also possible for the electronic sensors for determining the cycle time to not be incorporated with the monitoring system. Monitoring the fill of a bucket or truck tray and/or cycle time can help mine operators (or the like) to better optimize its operations. In an alternative embodiment, a pressure sensor may be used instead of an accelerometer to determine when the digging cycle has started. The pressure sensor may be a hydraulic pressure sensor integrated with the boom of the earth working equipment. In another preferred embodiment, a strain gauge or load cell is used to determine when the digging cycle has started. The strain gauge or load cell may be located in the bucket or a wear member on the bucket. In an alternative embodiment, GPS may be used to determine the orientation of the bucket.

The monitoring system may be equipped with electronic sensors that are capable of determining high impact events on the bucket digging edge (i.e., higher than experienced during normal digging operation). For example, the monitoring system may utilize an accelerometer, strain gauge, load cell, or pressure sensor to determine peak impacts (not shown). Programmable logic may record the time of the high impact event. The results of the high impact events may be communicated to the equipment operator or to a wireless device. It is also possible for the electronic sensors for determining the high impact event to be separate components from the electronic sensor for determining the digging cycle time or not be incorporated with the monitoring system.

Figure 9:
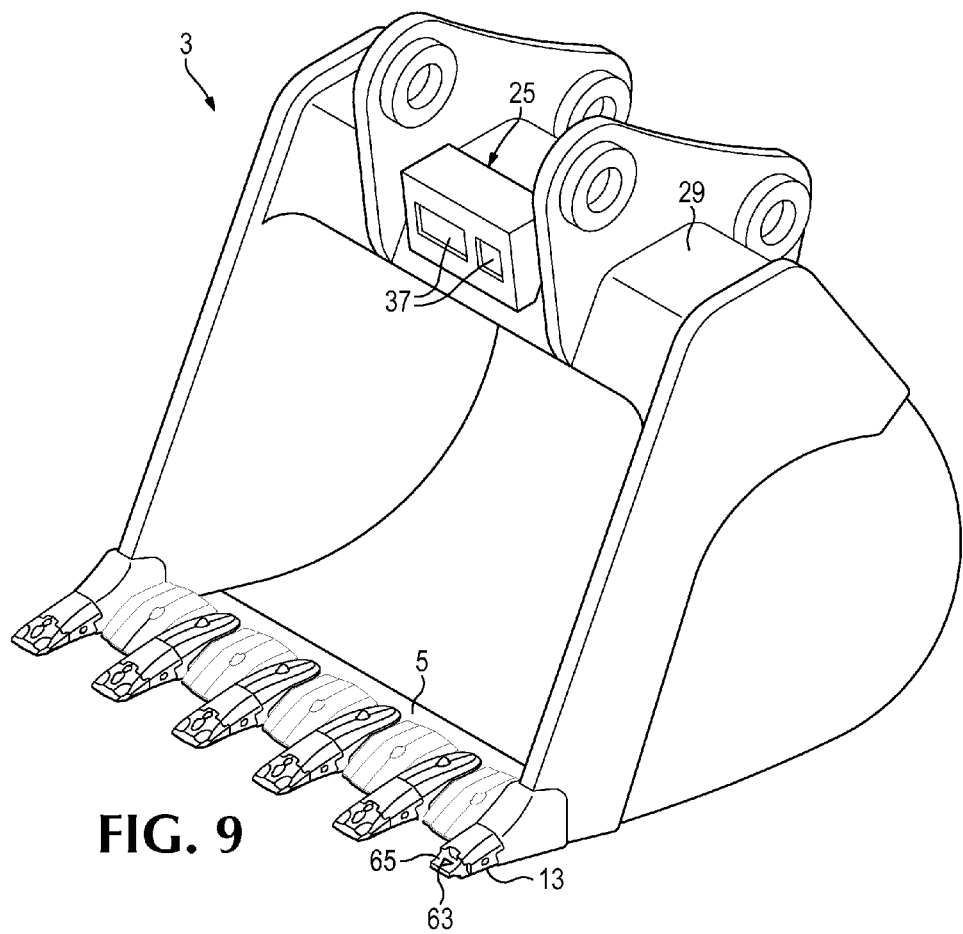
FIG. 9 is a perspective view of a bucket with a monitoring system installed on the bridge of the bucket in accordance with the present invention.
Figure 10:
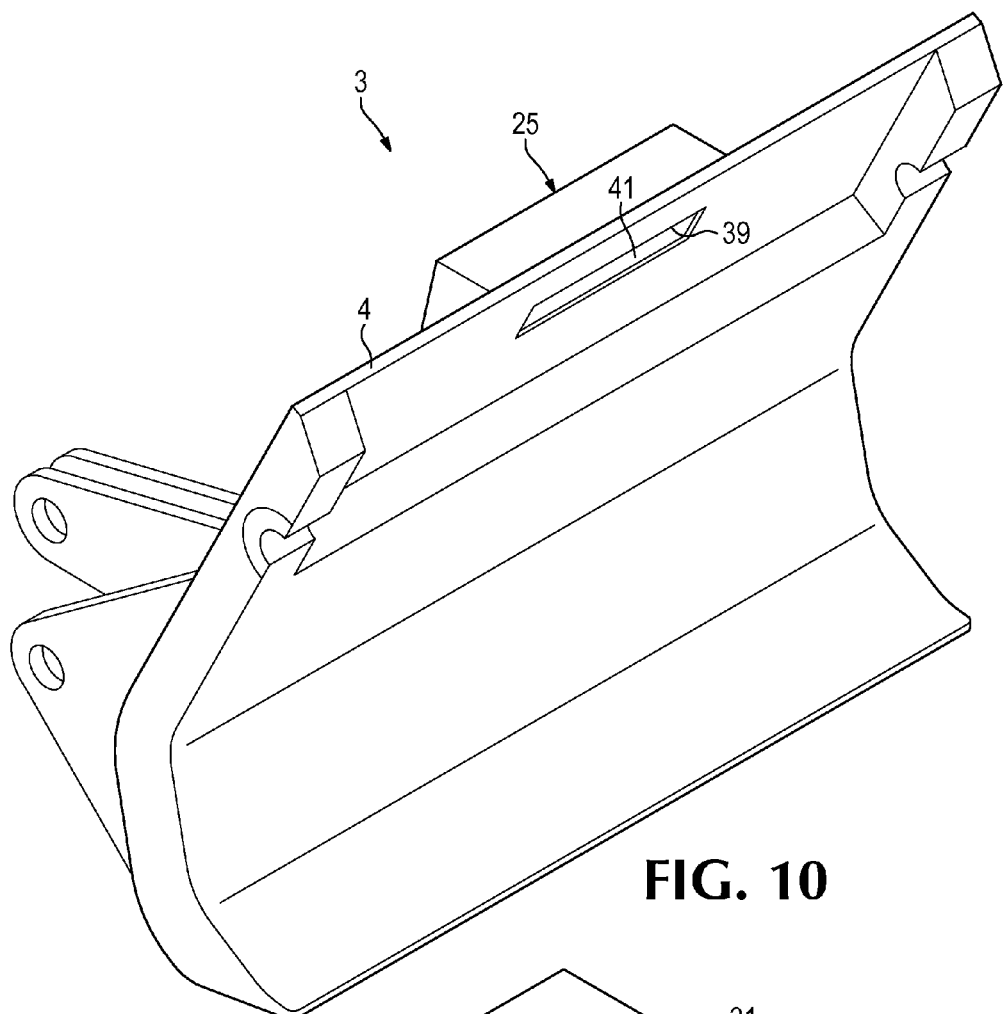
FIG. 10 is a perspective view of a top portion of a hydraulic face shovel bucket with a monitoring system integrated with the shell of the bucket in accordance with the present invention. The lip, bottom wall, side walls, and other details of the bucket are omitted to simplify the drawing.

In accordance with one embodiment of the invention the monitoring system 25 having at least one electronic sensor is incorporated with the bucket 3 so that the sensor always has a clear line of sight to the digging edge or lip 5 of the bucket 3 regardless of how the operator orients the bucket 3 during the digging and dumping operation (FIGS. 9 and 10). The electronic sensor may be, for example, integrated with the shell 4 of the bucket (FIG. 10), integrated between two interior plates of a bucket having a double wall shell (not shown), or installed on the bridge 29 or top of the bucket (FIG. 9). The electronic sensors may be, for example, a camera, an ultrasonic sensor, or a laser interferometer. The camera may be, for example, a Cognex 7100 camera. Nevertheless, the monitoring system could be mounted or integrated with, for example, a boom or other support of the excavating equipment, or to the body of the excavating equipment. In a non-bucket application, the monitoring system may be preferably mounted and or integrated to a base member supporting the wear part. The base member may be, for example, a truck tray or a blade. If the monitoring system is fixed to the truck tray the monitoring system may monitor the presence and/or health of runners on the truck tray. Similarly, if the monitoring system is fixed to the blade of a dozer or grader the monitoring system may monitor the presence and/or health of the end bits on the blade or the leading edge of the blade. Like mounting the monitoring system on the bucket, mounting on the truck tray or blade would provide a clear line of sight to the part or parts being monitored.

Figure 11:
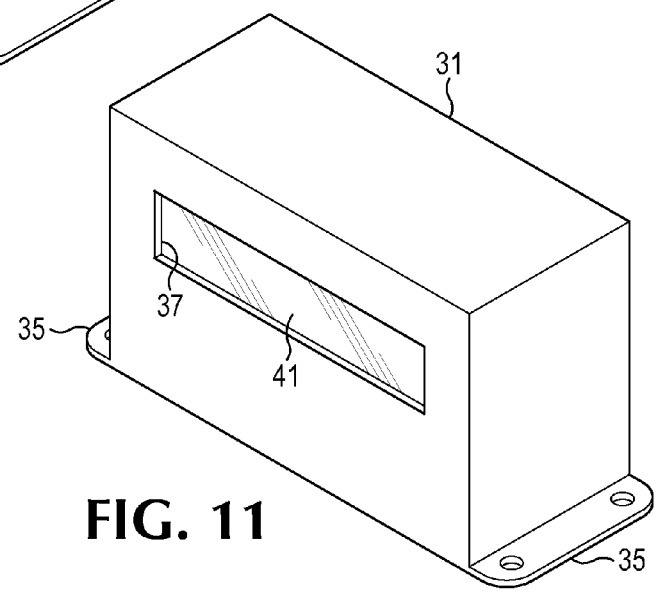
FIG. 11 is a perspective view of an enclosure for a monitoring system in accordance with the present invention.

The electronic sensor(s) 27 may be housed in one or more enclosures 31 in one or more locations on the wear part that engages and moves the ground to be excavated to protect the electronic sensor(s) 27 from the harsh mining environment and to keep the aperture 33 of the housing of the electronic sensor 27 free of fines, dirt, or other material that may negatively impact the electronic sensor 27 (FIGS. 8 and 11). The enclosure 31 may have one or more mounting brackets 35 for mounting the enclosure 31 on the first wear part. The enclosure 31 may house additional electronic equipment (not shown) for controlling and processing the data from the electronic sensor 27. In an alternative embodiment, some or all of the additional electronic equipment may be housed on the excavating equipment or in a remote location (not shown). For example, one or more electronic sensors 27 may be located in one or more locations in/on the bucket and the electronic sensors 27 may communicate via a wire or wirelessly with other electronic sensors and/or the additional electronic equipment within the cab of the excavating equipment. In alternative embodiments, one or more electronic sensors 27 (shown in phantom lines in FIG. 9) may be located on or in a second wear part(s) that are attached to the first wear part(s) that engages and moves the ground to be excavated. The first wear part(s) may be, for example, a bucket, a blade, a truck body, or the like and the second wear part(s) may be, for example, a point, an intermediate adapter, an adapter, a shroud, a nose, a lip, a wear runner, a truck liner, or the like. The electronic sensor(s) in the second wear part may communicate with electronic sensor(s) on the first wear part, the second wear part(s) and/or with the additional electronic equipment that may be located on the first wear part or located remote to the first wear part. As with the electronic sensor(s) in the first wear part, the electronic sensor(s) in the second wear part may communicate via a wire or wirelessly. The additional electronic equipment may be, for example, a controller, a power supply, a camera, and/or a wireless device. The controller may be, for example, an S7-1200 PLC sold by Siemens. The power supply may power just the electronic sensor or may also power the additional electronic equipment. In an alternative embodiment, two power supplies are provided. A first power supply to power the electronic equipment and a second power supply to power the additional electronic equipment. The power supply may be, for example, a power supply sold by TDK-Lambda and/or an SDC-5 Power Supply. The camera may be, for example, a Closed-Circuit Television (CCTV) camera. The CCTV camera may provide a HMI with a live feed of the lip of the bucket. Details of the HMI will be discussed in further detail below. The wireless device may be, for example a wireless serial device server sold by B &B Electronics (formerly Quatech).

Figure 12:
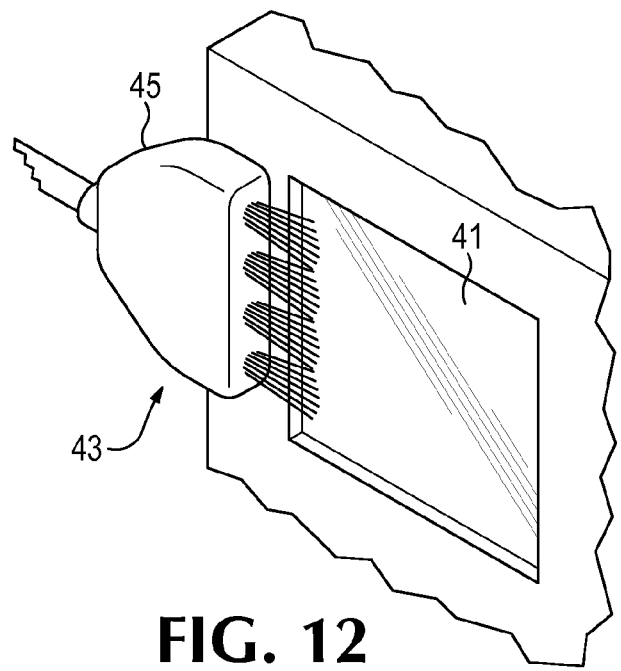
FIG. 12 is a perspective view of a nozzle and/or wiping tool for keeping a transparent wall clean in accordance with the present invention.
Figure 13:
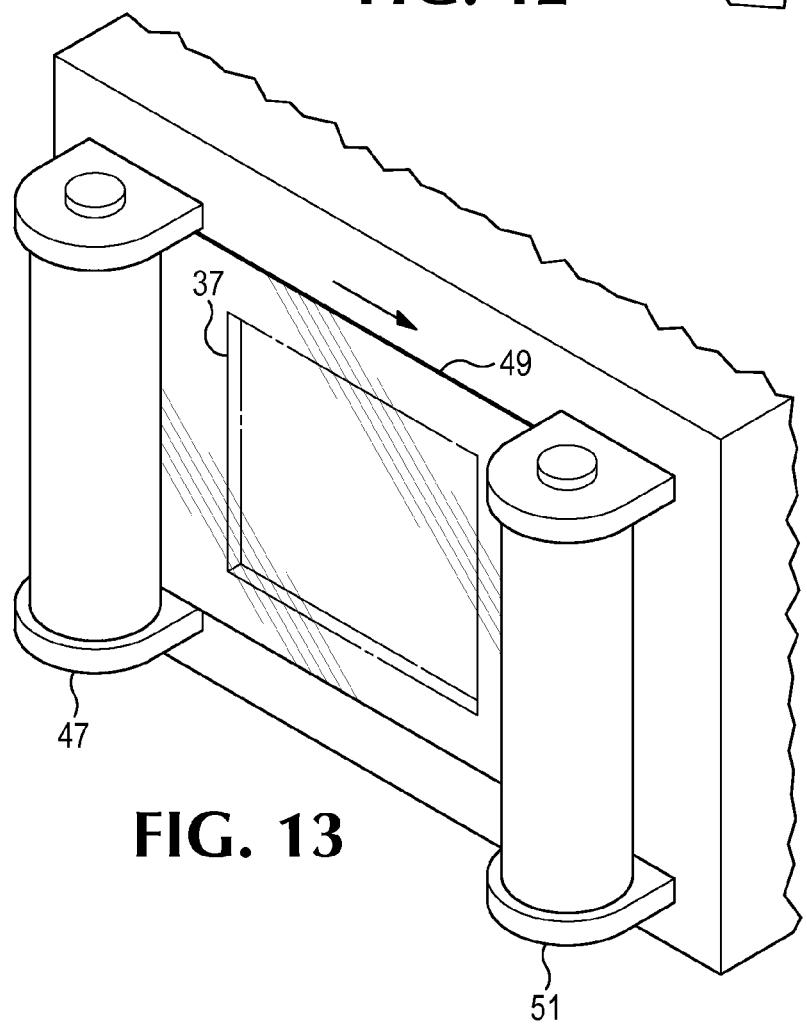
FIG. 13 is a front perspective view of a device for keeping a transparent material clean in accordance with the present invention.

The enclosure may have at least one cutout 37 on one side so that the aperture 33 of the at least one electronic sensor 27 has a clear line of sight to the lip 5 of the bucket 3 (FIGS. 8, 9 and 11). In an alternative embodiment, the bucket may have a cutout 39 so that the aperture of the electronic sensor has a clear line of sight to the lip (not shown) of the bucket (FIG. 10). The cutout 37 or 39 may be covered with a transparent wall 41, a translucent wall, or a clear wall so that the electronic sensor is completely sealed within the enclosure (FIGS. 8, 10, and 11). In addition a nozzle 43 may be directed to spray air, water, or another type of cleaning agent on the transparent wall 41 so that as dirt and fines accumulate the air, water or cleaning agent cleans the transparent wall 41 and keeps the transparent wall 41 see through (FIG. 12). In an alternative embodiment, the electronic sensor may have a built in transparent cover to protect the aperture of the electronic sensor and the nozzle may be directed to spray the air, water, or cleaning agent directly on the transparent cover of the electronic sensor (not shown). In an alternative embodiment, a wiping tool 45 may be provided to clean off the transparent cover of the aperture or the transparent wall 41 (FIG. 12). The wiping tool may be integrated with a nozzle for spraying the air, the water, or the cleaning agent. In an alternative embodiment the wiping tool may be a separate tool from the nozzle. The wiping tool may be, for example, a comb, brush, or a squeegee. In an alternative embodiment, the cutout 37 in the enclosure or the cutout within the bucket may be provided with a first spool 47 of transparent material 49 that stretches across the cutout to a second spool 51 (FIG. 13). As the transparent material 49 becomes opaque, a motor (not shown) may spin the second spool 51 so that the transparent material 49 moves from the first spool 47 to the second spool 51 and a new section of transparent material 49 covers the cutout. In an alternative embodiment, the cutout may be provided with multiple layers of transparent material so that when the top layer needs to be replaced the old top layer can be torn away to expose a new layer of transparent material (not shown). In yet another alternative embodiment, the aperture of the electronic sensor may have a movable cover. The movable cover may cover the electronic sensor when not in use and may be removed so that the electronic sensor can take a measurement (not shown).

The electronic sensor 27 and additional electronic equipment (not shown) may be mounted on vibration dampening devices 53 so that the vibrations of the digging and dumping operation do not negatively affect the electronic sensor 27 and additional electronic equipment (FIG. 8). Various vibration dampening devices 53 known in the industry may be used to dampen the vibrations experienced. The vibration dampening devices 53 may be, for example, mounted to the top and bottom of a mounting unit 55 that holds the electronic sensor 27. The vibration dampening devices 53 may be, for example, elastomers or springs.

Figure 14:
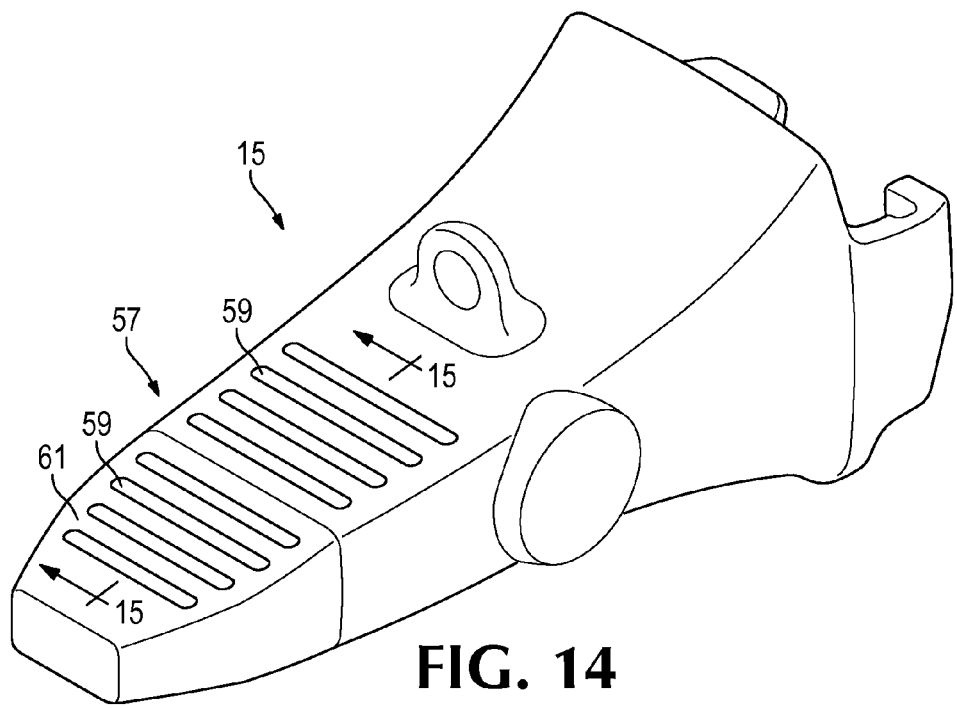
FIG. 14 is a perspective view of a wear member with a unique feature and/or pattern along the length of the expected wear profile of the wear member in accordance with the present invention.
Figure 15:
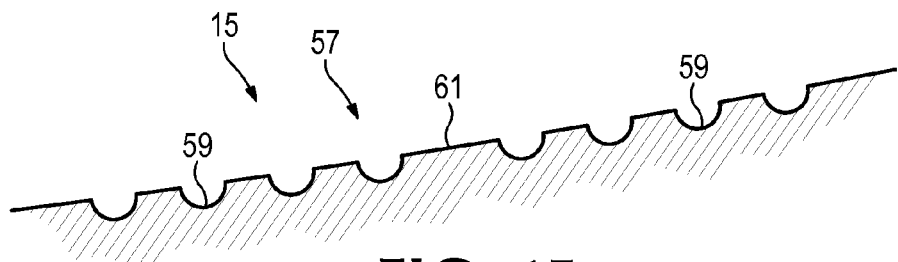
FIG. 15 is a partial side view taken along lines 15-15 of the wear member shown in FIG. 14.

A unique feature and/or pattern 57 may be added along the length of the expected wear profile of the wear member 15 to aid the monitoring system in determining the current wear profile of the wear member 15 (FIGS. 14 and 15). The unique feature and/or pattern 57 may be added to the wear member 15 at the time of manufacture or after manufacturing. The unique feature and/or pattern 57 may be, for example, grooves 59 and/or ridges cut, cast, or forged into the top exterior surface 61 of the wear member 15. In an alternative embodiment, the unique feature and/or pattern may be a hardfacing material applied to the top exterior surface of the wear member (not shown). As the wear member 15 penetrates the ground and is worn the unique features and/or pattern 57 also wears away. The electronic sensor may be able to detect how much of the unique features and/or pattern 57 remains (e.g., how many grooves 59 and/or ridges remain). Based on the current wear profile and the set minimum wear profile, the health monitoring unit can send an alert (which could be a visual, audible, and/or haptic alarm) when the wear member 15 is about to be worn to the minimum wear profile. A separate alert may be sent when the wear member 15 has been worn past the minimum wear profile.

Figure 16:
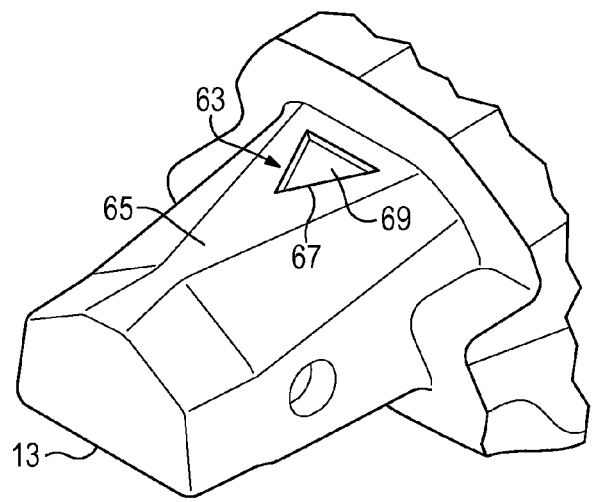
FIG. 16 is a perspective view of a base with a unique feature and/or pattern in the top surface of the base so that the unique feature and/or pattern can only be seen when the wear member is not present in accordance with the present invention.

Unique features and/or patterns may be incorporated onto the wear member or base to aid in absence and presence detection. The unique feature and/or pattern may be added to the wear member or base at the time of manufacture or after manufacturing. The unique feature and/or pattern 57 may be, for example, grooves 59 and/or ridges cut, cast, or forged into the top exterior surface 61 of the wear member (FIGS. 14 and 15). In an alternative embodiment, the unique feature and/or pattern may be a hardfacing material applied to the top exterior surface of the wear member (not shown). In an alternative embodiment, the unique feature and/or pattern 63 may be, for example, a shape cut, cast, or forged into the top surface 65 of the base 13 so that the unique feature and/or pattern 63 is only visible if the wear member is no longer attached to the base 13 (FIGS. 9 and 16). In an alternative embodiment, hardfacing may be used to apply a shape to the top surface of the base (not shown). In an alternative embodiment, a shape 67 may be cut in the top surface 65 of the base 13 and a medallion 69 may be press fit, glued, or otherwise secured within the cut (FIG. 16).

Figure 17:
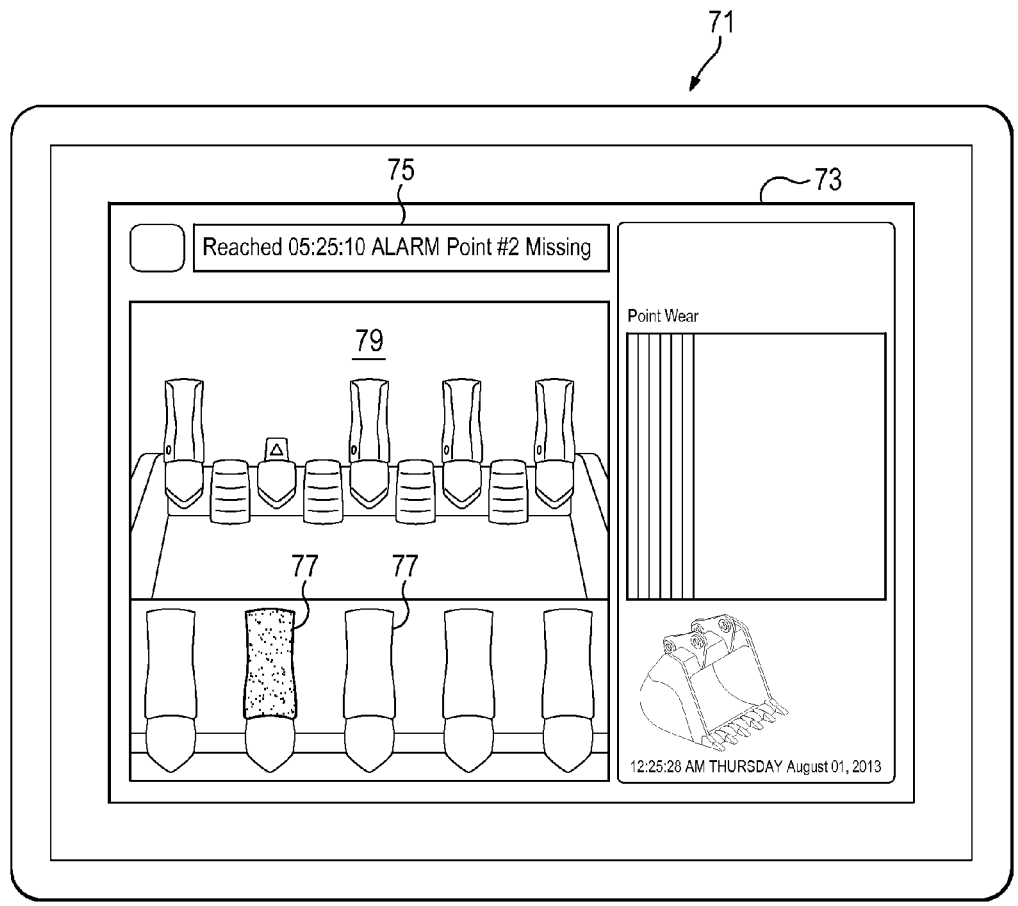
FIG. 17 is a front view of a Human Machine Interface (HMI) to be used with a monitoring system in accordance with the present invention.
Figure 18:
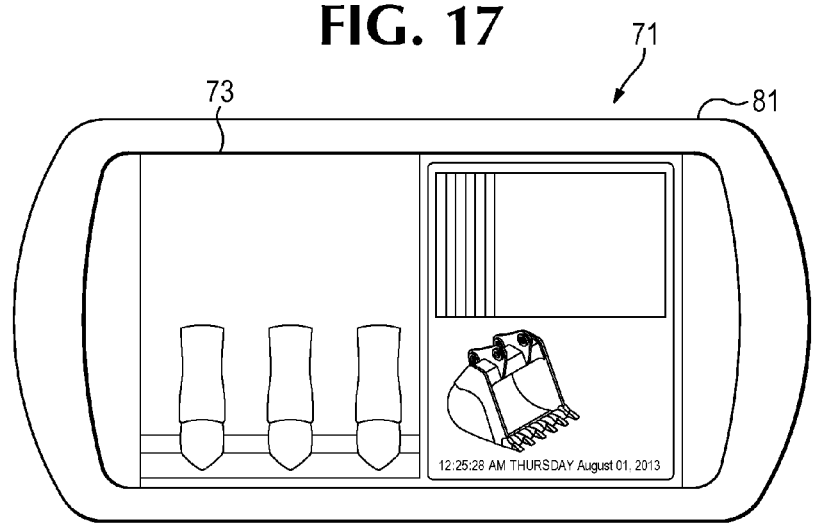
FIG. 18 is a front view of a mobile HMI to be used with a monitoring system in accordance with the present invention.

At least one HMI 71 may be provided to display the current status and health of the wear members on the bucket (FIGS. 17 and 18). The HMI 71 may be hard wired to the monitoring system or may be a wireless device 81 (FIG. 18). The HMI 71 may be located in the cab 2 of the excavating equipment 1 (FIG. 1) or may be located in a remote location. In addition the HMI may be integrated with a display system currently in the excavating equipment (e.g., with the OEM display), may be integrated with a new display system within the excavating equipment, or may be integrated with a remote display system. The HMI 71 may be configured to provide a graphical display 73 of the current status of the wear members on the lip of the bucket (FIGS. 17 and 18). The HMI 71 may, for example, provide visual alerts (e.g., text 75 and/or pictorial images), haptic feedback (e.g., vibrations), and audio alerts regarding the status of each wear member (FIG. 17). The visual alert may be, for example, a graphical picture 77 displaying each wear member and the status of each wear member (i.e., absent/present, acceptable wear, needing maintenance). The HMI 71 may be designed to display a live image 79 of the lip of the bucket so that an operator can visually check that an alert is valid. The HMI may be designed to display a history chart (not shown) so that an operator can determine when an alert happened so that an operator can take the necessary actions if a wear member is lost.

The various monitoring systems and features can be used together or as a single stand-alone system without the other capabilities. Although the above discussion has discussed the invention in connection with teeth on a bucket, the system can be used to sense the presence and/or health of other wear parts on a bucket such as shrouds, wings, and/or runners. Moreover, systems of the present invention can also be used to monitor the presence and or health of wear parts on other kinds of earth working equipment such as runners on chutes or truck trays, or end bits on blades.

The above disclosure describes specific examples for a bucket wear monitoring system. The system includes different aspects or features of the invention. The features in one embodiment can be used with features of another embodiment. The examples given and the combination of features disclosed are not intended to be limiting in the sense that they must be used together.

The invention claimed is:

1. A tool for monitoring wear parts used on earth working equipment, the tool comprising at least one electronic sensor, a securement mechanism for securing the at least one electronic sensor to a first earth working wear part to monitor the first wear part and a second earth working wear part secured to the first wear part, a programmable logic device receiving information from the at least one electronic sensor and making a determination of at least one of presence, wear, impact, fill, and performance of the first wear part and the second wear part.

2. A tool in accordance with claim 1 wherein the securement mechanism is adapted to attach the at least one electronic sensor to a bucket.

3. A tool in accordance with claim 2 wherein the securement mechanism attaches the at least one electronic sensor to an interior surface of the bucket.

4. A tool in accordance with claim 2 wherein the securement mechanism attaches the at least one electronic sensor to an exterior surface of the bucket.

5. A tool in accordance with claim 2 wherein the programmable logic device receives information from the at least one electronic sensor to determine a cycle time of a digging cycle.

6. A tool in accordance with claim 1 wherein the programmable logic device receives information from the at least one electronic sensor to determine when the second wear part has been worn to a state indicating that the second wear part should be replaced.

7. A tool in accordance with claim 6 wherein the at least one electronic sensor recognizes special features on the second wear part that have no earth working function, and the programmable logic device receives information from the at least one sensor regarding the special features to determine wear on the second wear part.

8. A tool in accordance with claim 6 including a second sensor secured to the second wear part, wherein the second sensor communicates with the programmable logic so that information from both the electronic sensor and the at least one said second sensor is used to make a determination of at least one of presence, wear, impact, fill, and performance of at least one of the first wear part and the second wear part.

9. A tool in accordance with claim 1 wherein the programmable logic device receives information from the at least one electronic sensor to determine when the second wear part has detached from the first wear part.

10. A tool in accordance with claim 1 wherein the securement mechanism is adapted to attach the at least one electronic sensor to a truck body.

11. A tool in accordance with claim 1 wherein the securement mechanism is adapted to attach the at least one electronic sensor to a blade.

12. A tool in accordance with claim 1 wherein the programmable logic device receives information from the at least one electronic sensor to determine when the second wear part has been worn to a state that the second wear part should be replaced.

13. A tool in accordance with claim 1 wherein the programmable logic device receives information from the at least one electronic sensor to calculate an operational efficiency of the first and second wear parts.

14. A tool in accordance with claim 1 wherein the programmable logic device receives information from the at least one electronic sensor to determine a fill level of the first wear part.

15. A tool in accordance with claim 1 wherein at least one of the said sensors is chosen from a group consisting essentially of a camera, a laser range finder, and an ultrasonic sensor.

16. A tool in accordance with claim 1 wherein the programmable logic device receives information from the at least one electronic sensor to determine a high impact event of the first wear part.

17. A tool in accordance with claim 1 wherein at least one of the said sensors is chosen from a group consisting essentially of a pressure sensor, a stain gauge, a load cell, and an accelerometer.

18. A tool in accordance with claim 1 wherein at least one of the said sensors is chosen from a group consisting essentially of an inclinometer and GPS.

19. A tool in accordance claim 1 wherein the programmable logic device receives information from the at least one electronic sensor to generate an alert based on the information received from the at least one electronic sensor.

20. A tool in accordance with claim 1 wherein the programmable logic device receives information from the at least one electronic sensor and the programmable logic communicates the information with a database.

21. A tool in accordance with claim 1 wherein the programmable logic device receives information from the at least one electronic sensor and the programmable logic communicates the information to a computer system that is remote to the first wear part.

22. A tool in accordance with claim 1 wherein the tool has a vibration dampening device and the at least one electronic sensor is mounted to the vibration dampening device.

23. A tool in accordance with claim 1 wherein the said electronic sensor has a housing with an aperture, and the tool includes a cover for protecting the aperture.

24. A tool in accordance with claim 1 wherein the programmable logic device is located remote from the first and second wear parts.

25. A tool in accordance with claim 1 wherein the programmable logic device is located on the first wear part.

26. A bucket for use with excavating equipment, the bucket comprising:
    a plurality of walls defining a containment portion for gathering earthen material to be excavated;
    a leading edge to initially contact the earthen material, the leading edge extending along one of the said walls defining the containment portion; and
    at least one electronic sensor mounted to one of the said walls of the bucket to monitor at least one of impact, fill, and performance of the bucket.

27. A bucket in accordance with claim 26 wherein the electronic sensor is mounted to an interior wall of the bucket.

28. A bucket in accordance with claim 26 wherein the electronic sensor is mounted to an exterior wall of the bucket.

29. A bucket in accordance with claim 26 including a programmable logic device to receive information from the at least one sensor to determine the at least one of impact, fill and performance of the bucket.

30. A bucket in accordance with claim 29 including a programmable logic device to receive information from the at least one sensor to determine the fill of the bucket for each digging cycle.

31. A bucket in accordance with claim 30 wherein the programmable logic device receives information from the at least one sensor to determine efficiency of the digging operation based on amount of earthen material moved per time of digging.

32. A bucket in accordance with claim 26 wherein the at least one electronic sensor is chosen from a group consisting essentially of a camera, a laser range finder, and an ultrasonic sensor.

33. A bucket in accordance with claim 26 wherein at least one of the said sensors is chosen from a group consisting essentially of a pressure sensor, a stain gauge, a load cell, and an accelerometer.

34. A bucket in accordance with claim 26 wherein at least one of the said sensors is chosen from a group consisting essentially of an inclinometer and GPS.

35. A wear assembly used on earth working equipment, the wear assembly comprising:
    a base secured to the earth working equipment, the base having a unique feature having no supporting function and detectable by an electronic sensor when visible;
    a wear member including a front end and a rear end, the rear end having a mounting portion to receive the base; and
    a securement mechanism to releasably secure the wear member to the base wherein the unique feature is hidden when the wear member is mounted on the base and the unique feature is visible when the wear member is not mounted on the base to indicate the absence of the wear member.

36. A bucket for use with excavating equipment, the bucket comprising:
    a plurality of walls defining a containment portion for gathering earthen material to be excavated;

a leading edge to initially contact the earthen material, the leading edge extending along one of the said walls defining the containment portion;

wear parts secured along the leading edge; and at least one electronic sensor mounted to one of the said walls of the bucket to monitor at least one of presence or wear of a plurality of the wear parts.

37. A bucket in accordance with claim 36 including a programmable logic device to receive information from the at least one electronic sensor to determine the expected useable life of the wear parts until they should be replaced.

38. A bucket in accordance with claim 36 including a programmable logic device to receive information from the at least one electronic sensor to determine when any of the wear parts has detached from the leading edge.

39. A bucket in accordance with claim 36 including a programmable logic device to receive information from the at least one electronic sensor, wherein the at least one electronic sensor recognizes special features on the wear parts that have no earth working function, and the programmable logic device determines the presence or wear of each of wear parts based on the sensing of the special features.

40. A bucket in accordance with claim 36 including a programmable logic device to receive information from the at least one electronic sensor to monitor the fill of the bucket on each digging cycle.

41. A bucket in accordance with claim 36 wherein the at least one electronic sensors is chosen from a group consisting essentially of a camera, a laser range finder, and an ultrasonic sensor.

42. A bucket in accordance with claim 36 including a vibration dampening device supporting the at least one electronic sensor.

43. A bucket in accordance with claim 36 including a housing with an aperture to enclose the at least one electronic sensor.

* * * * *